INVENTOR.
Linden A. Thatcher
BY Edwin H. Owen
ATTORNEY.

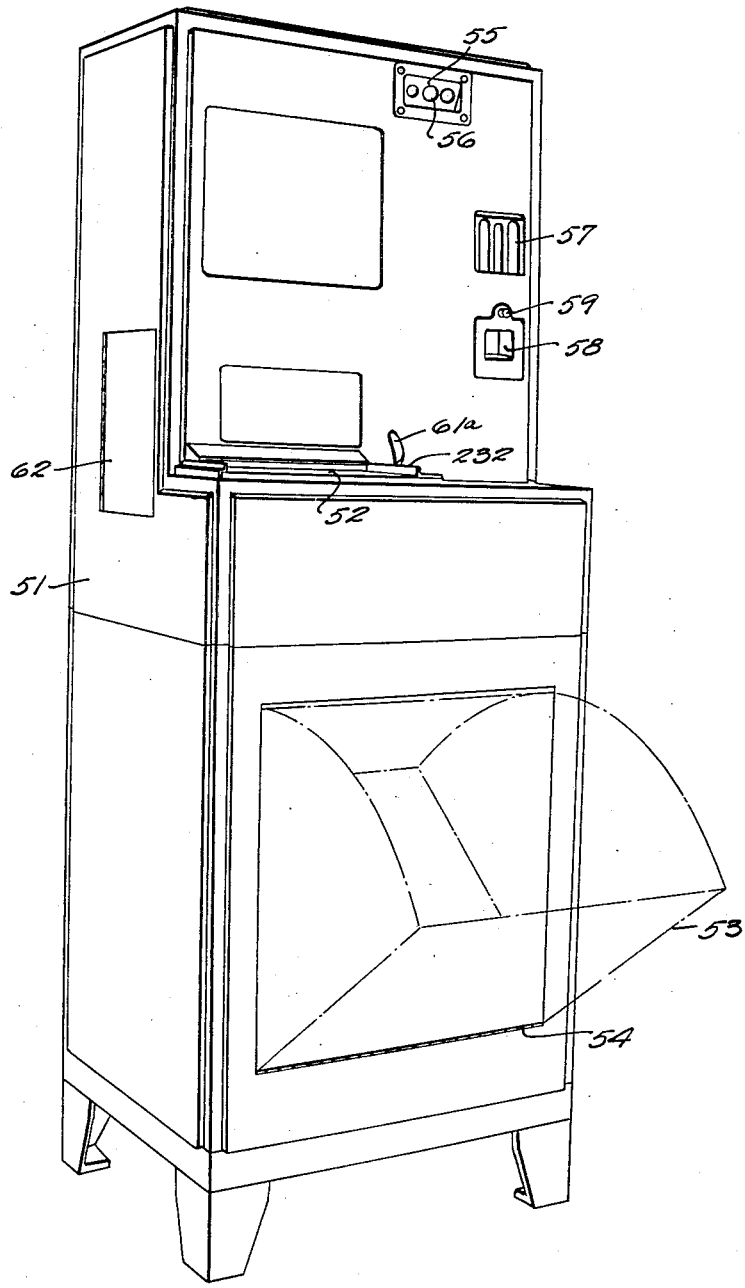

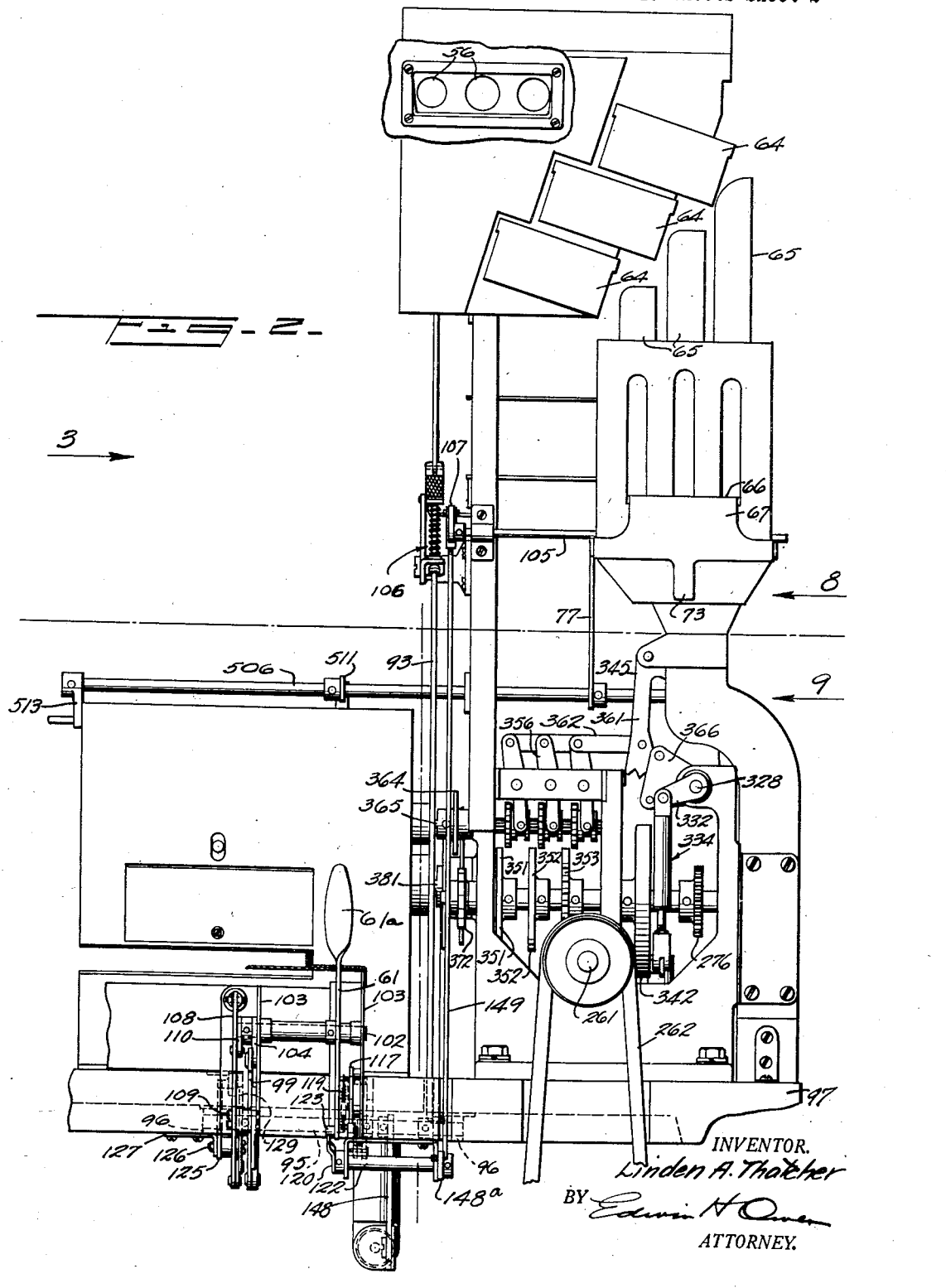

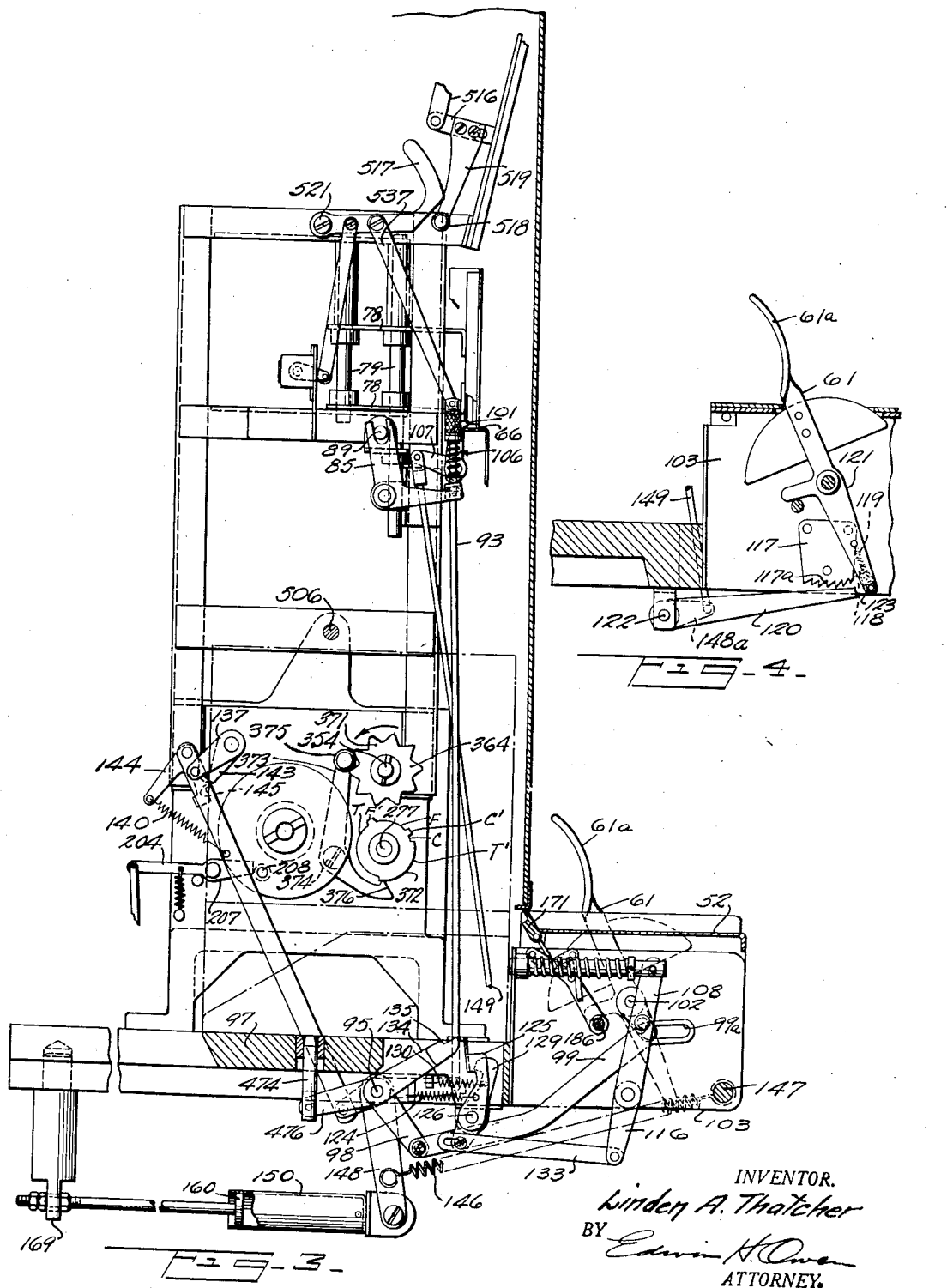

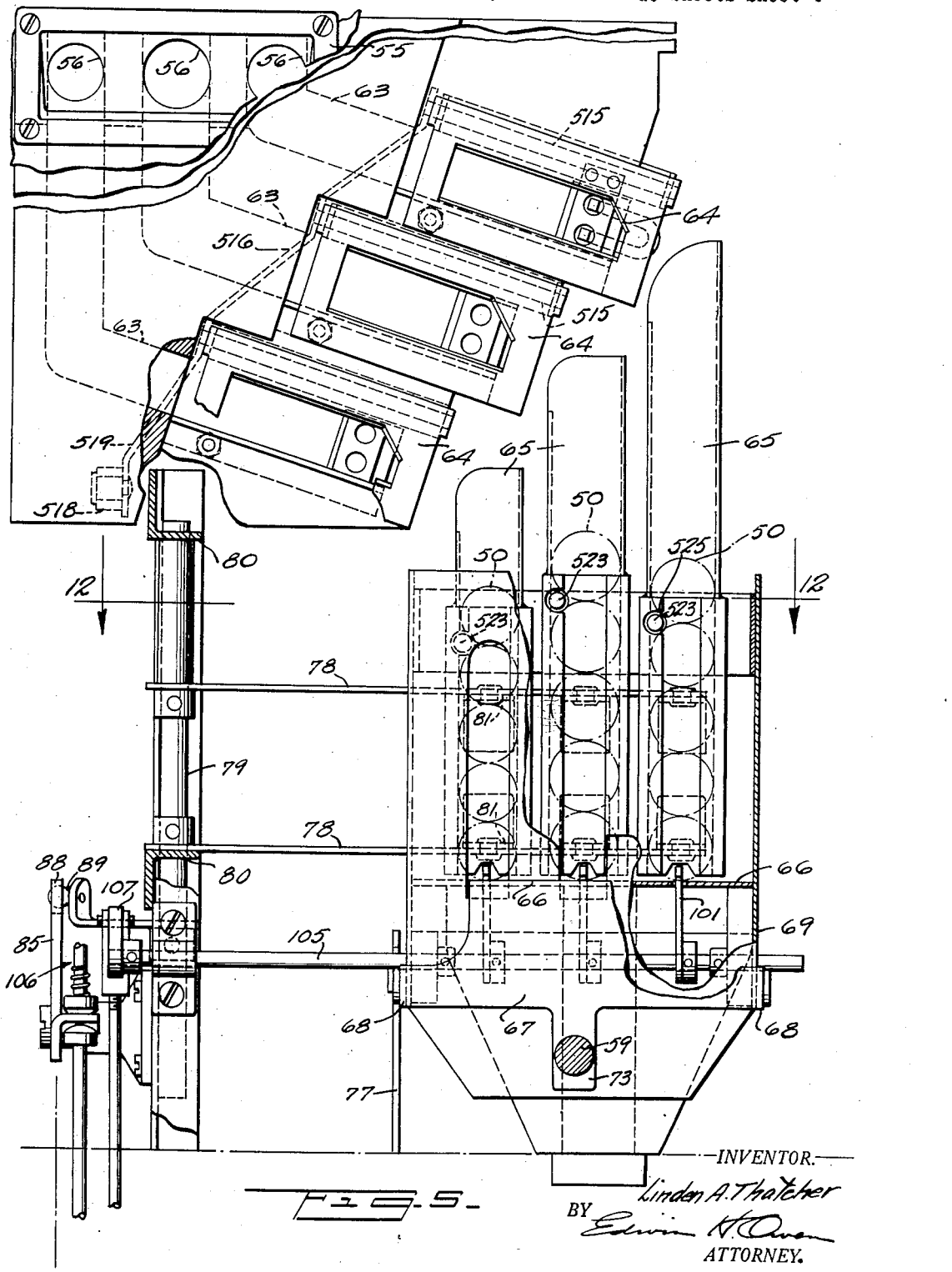

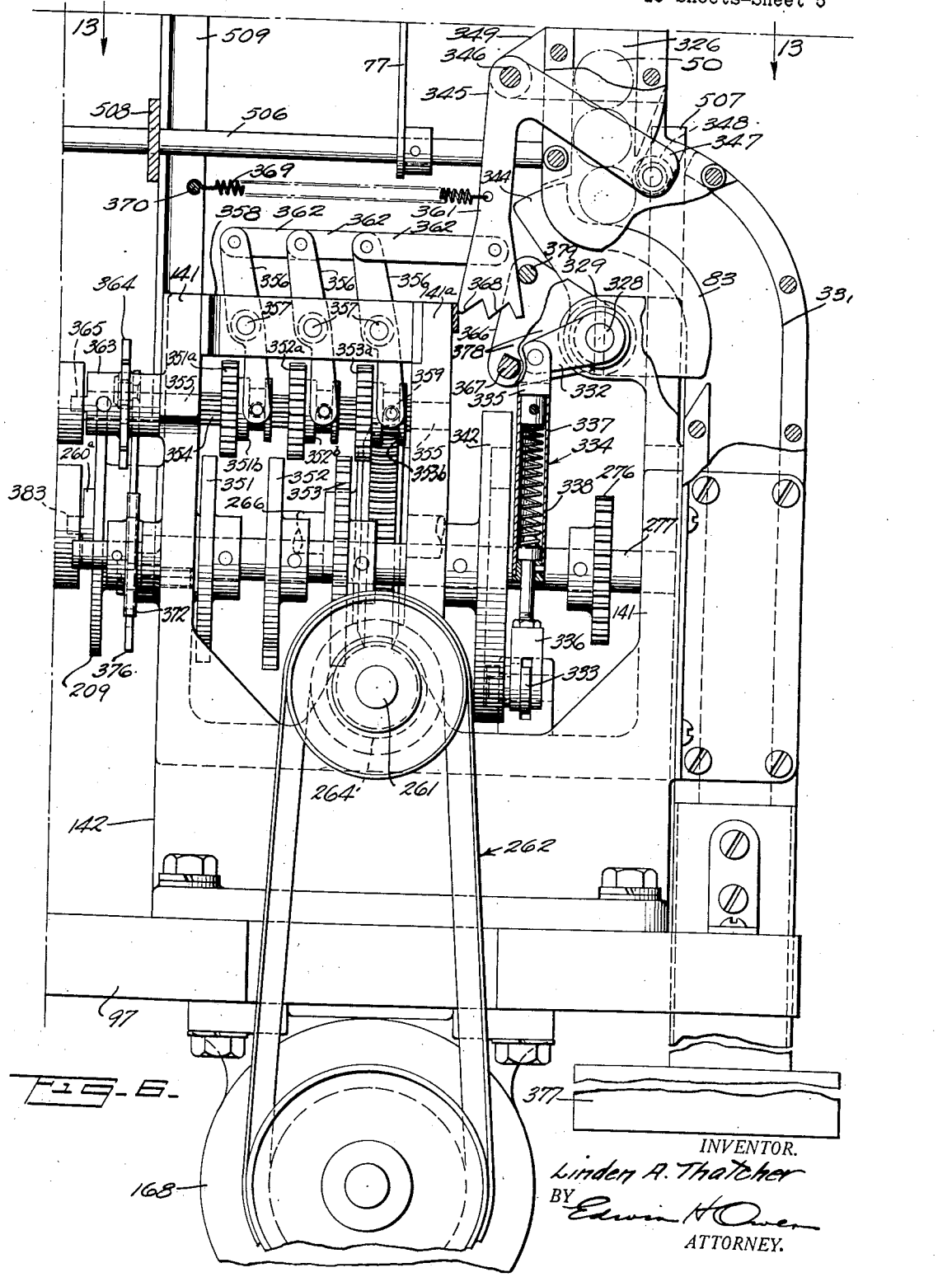

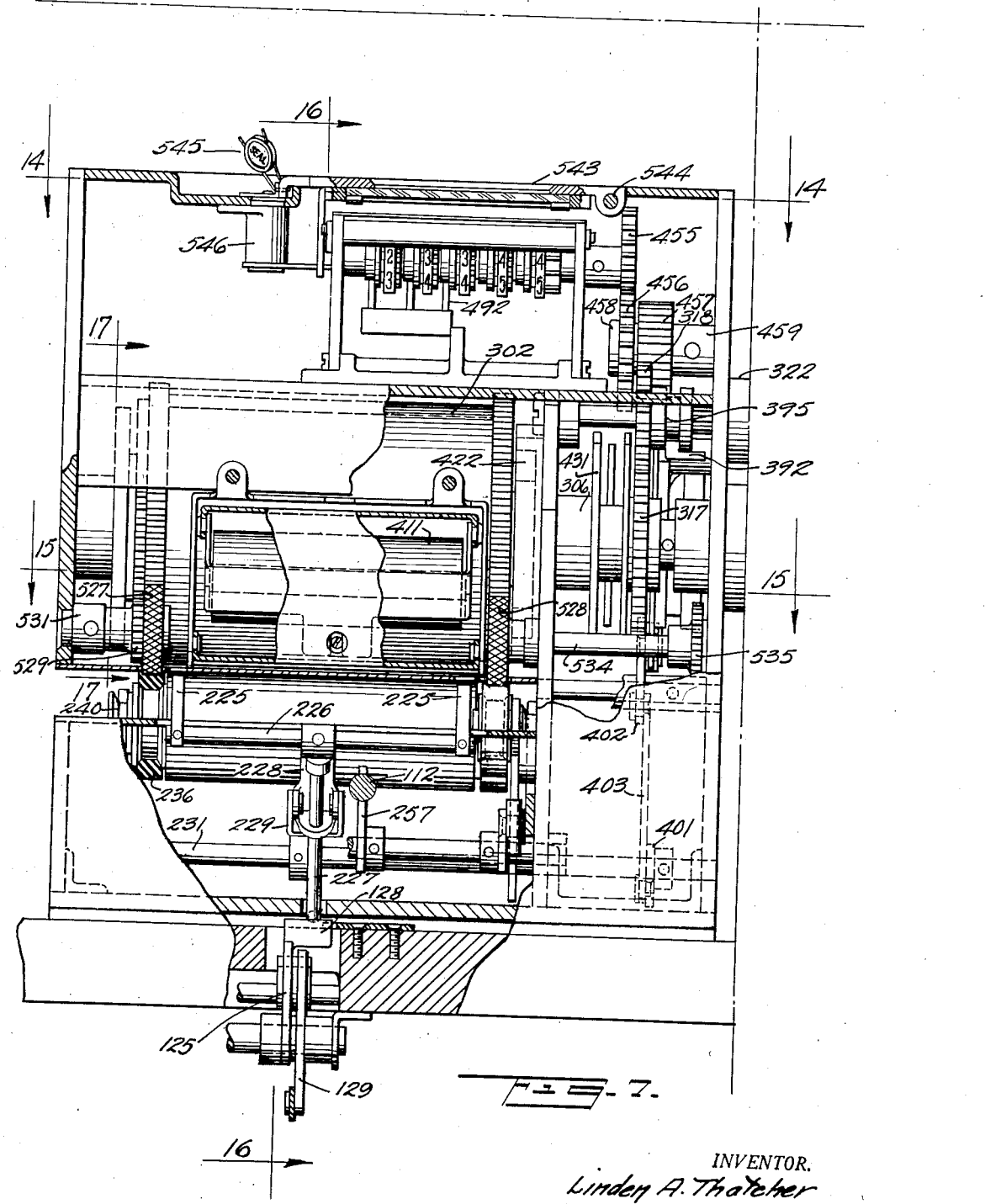

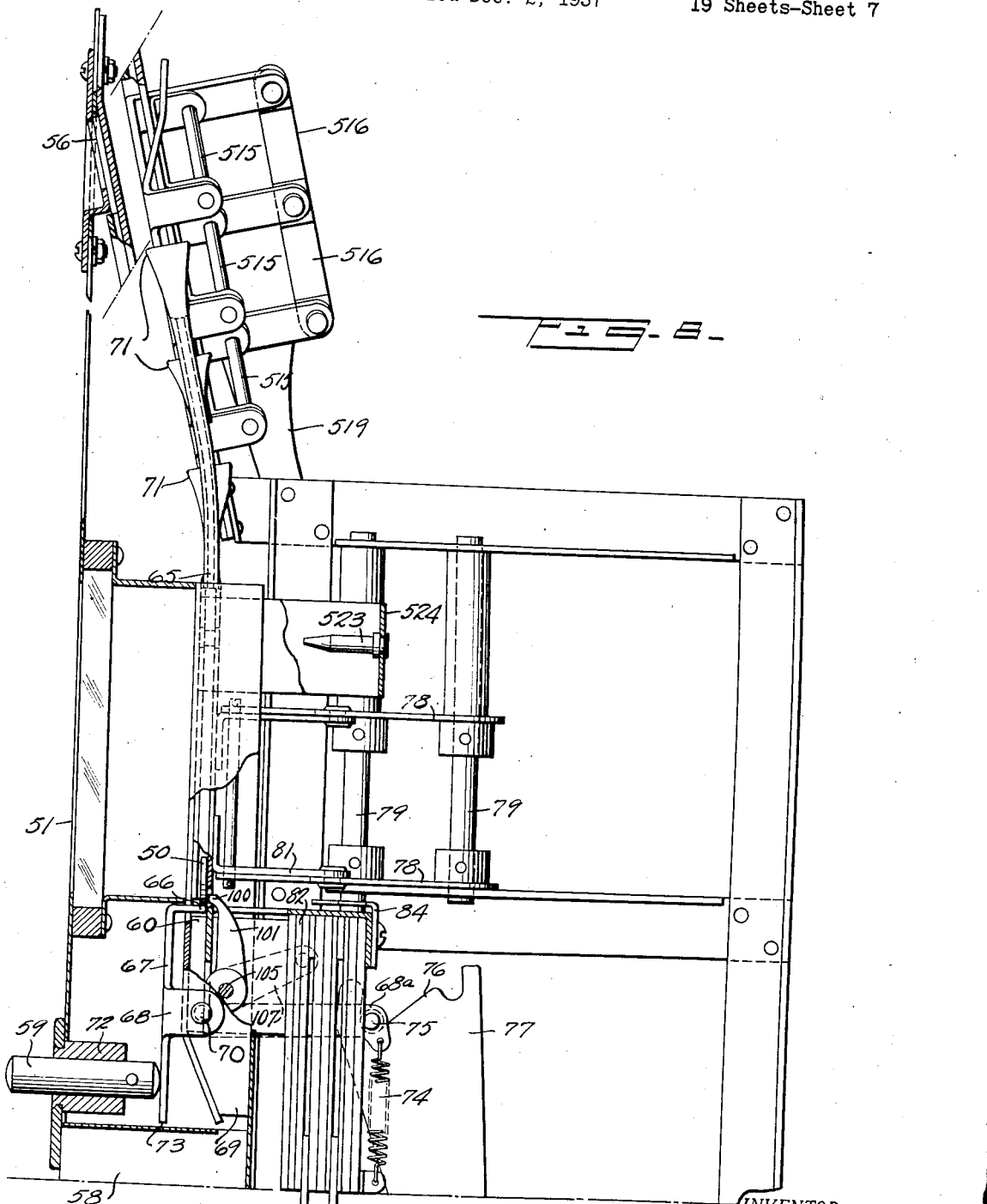

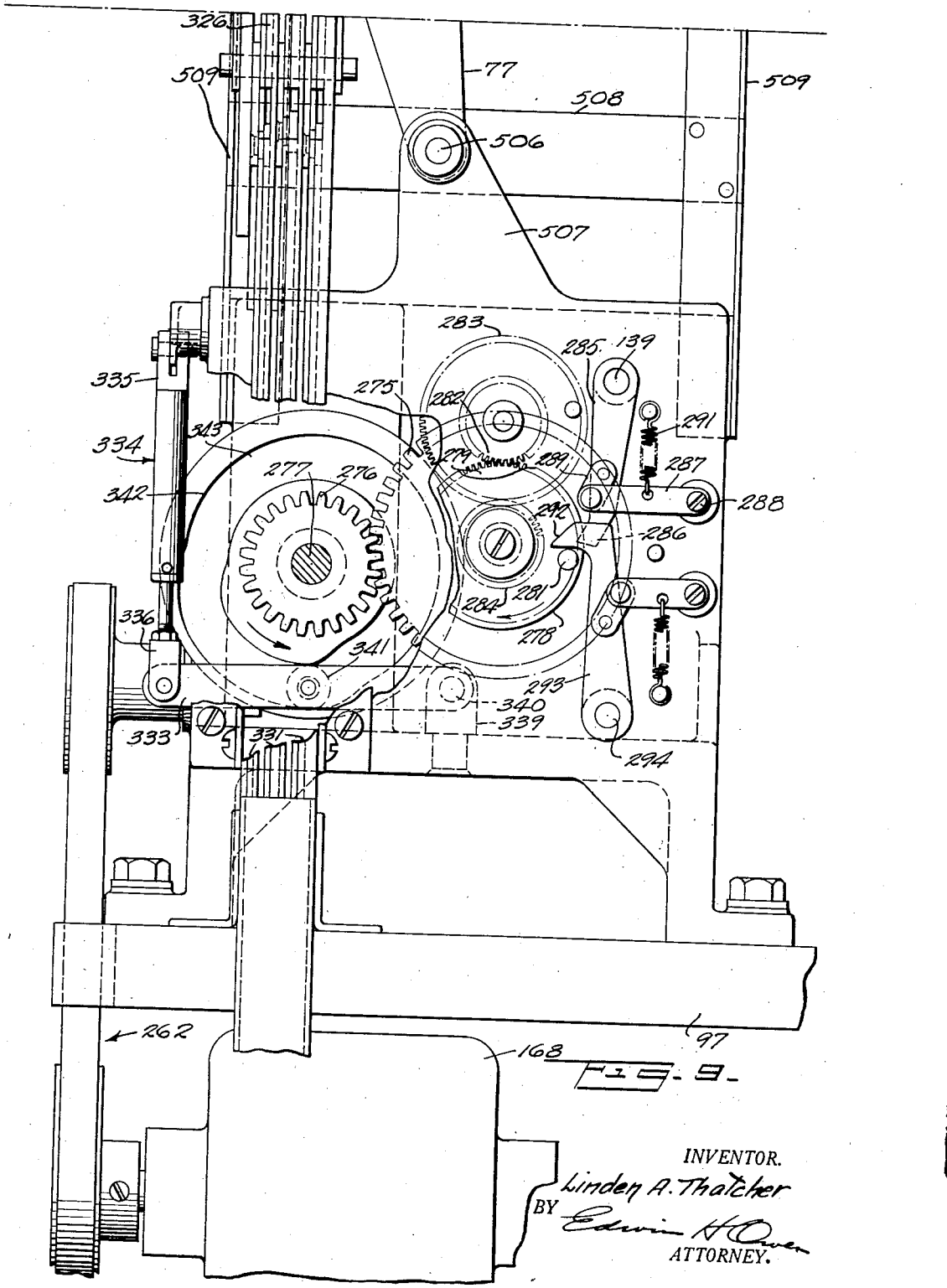

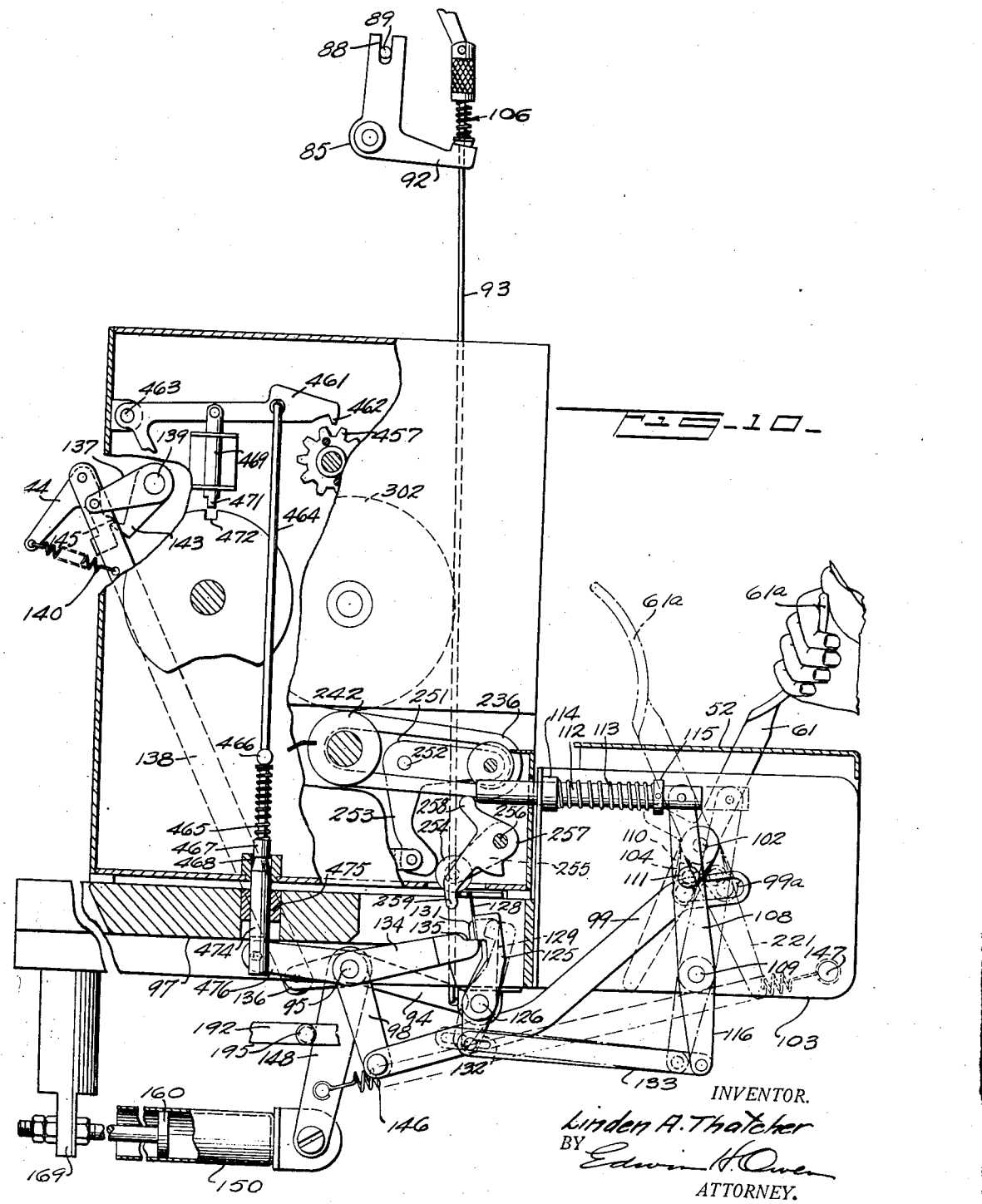

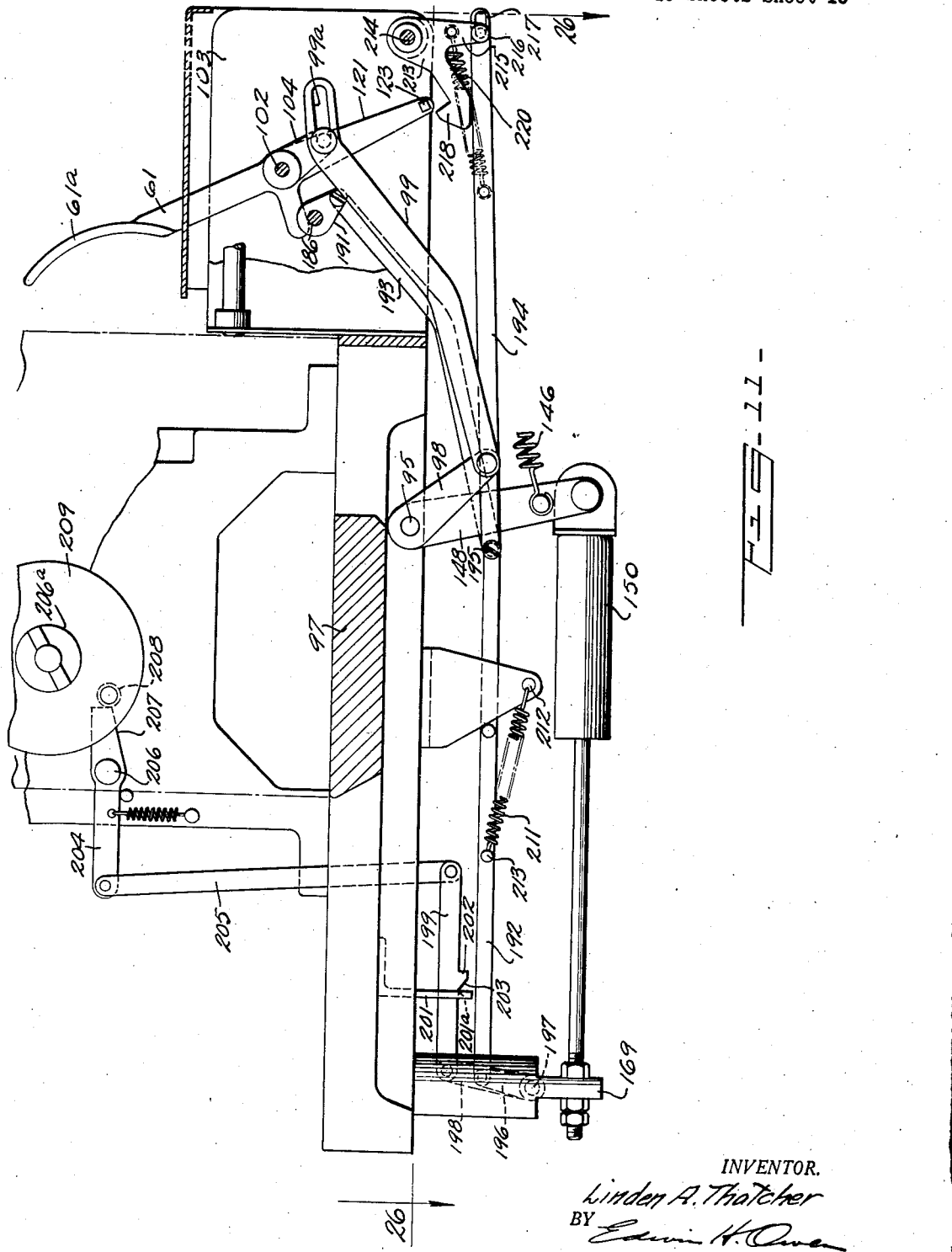

INVENTOR.
Linden A. Thatcher
BY
ATTORNEY.

Aug. 22, 1939.  L. A. THATCHER  2,170,270
COIN OPERATED MAILING MACHINE
Filed Dec. 2, 1937   19 Sheets-Sheet 13
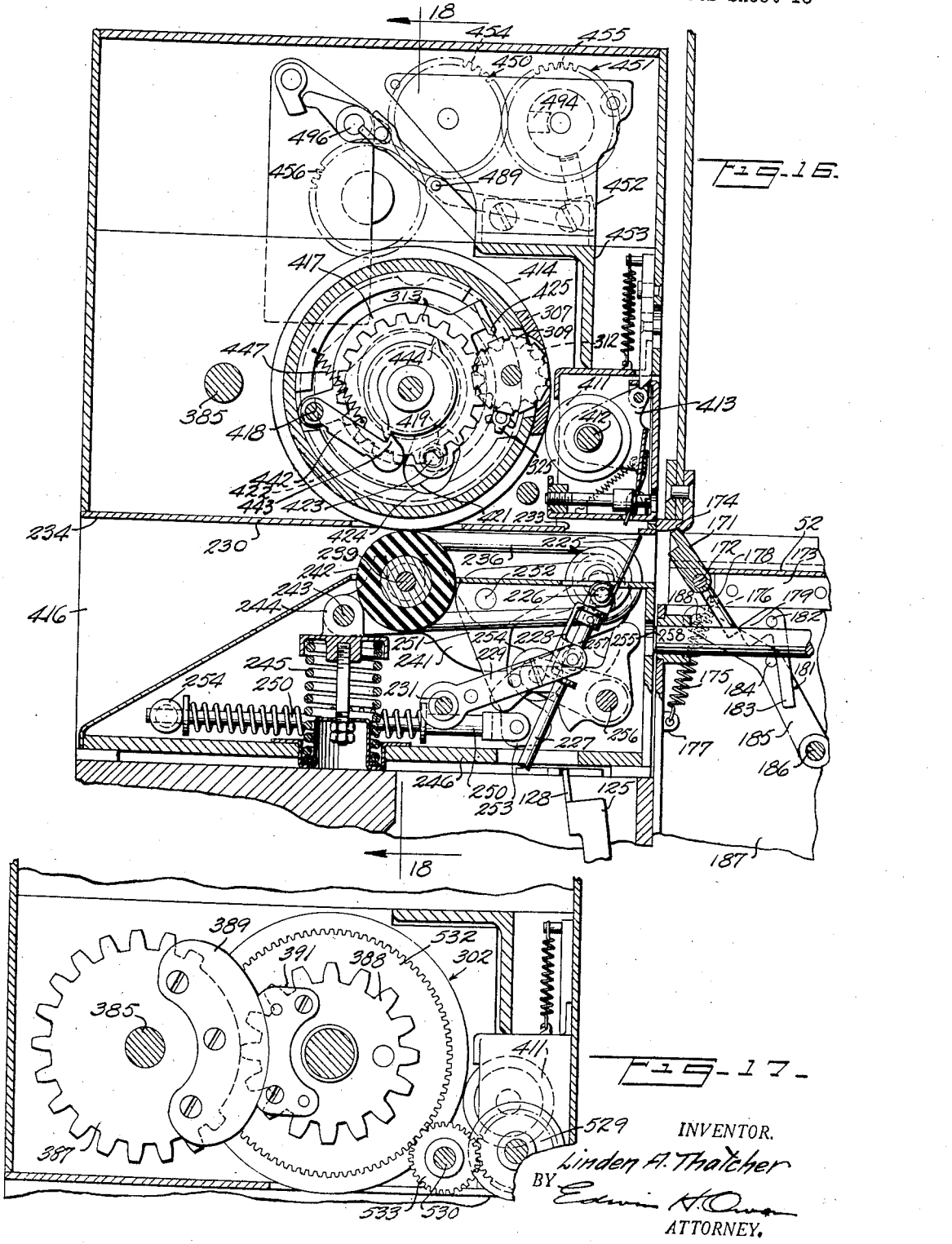
INVENTOR.
Linden A. Thatcher
BY
ATTORNEY.

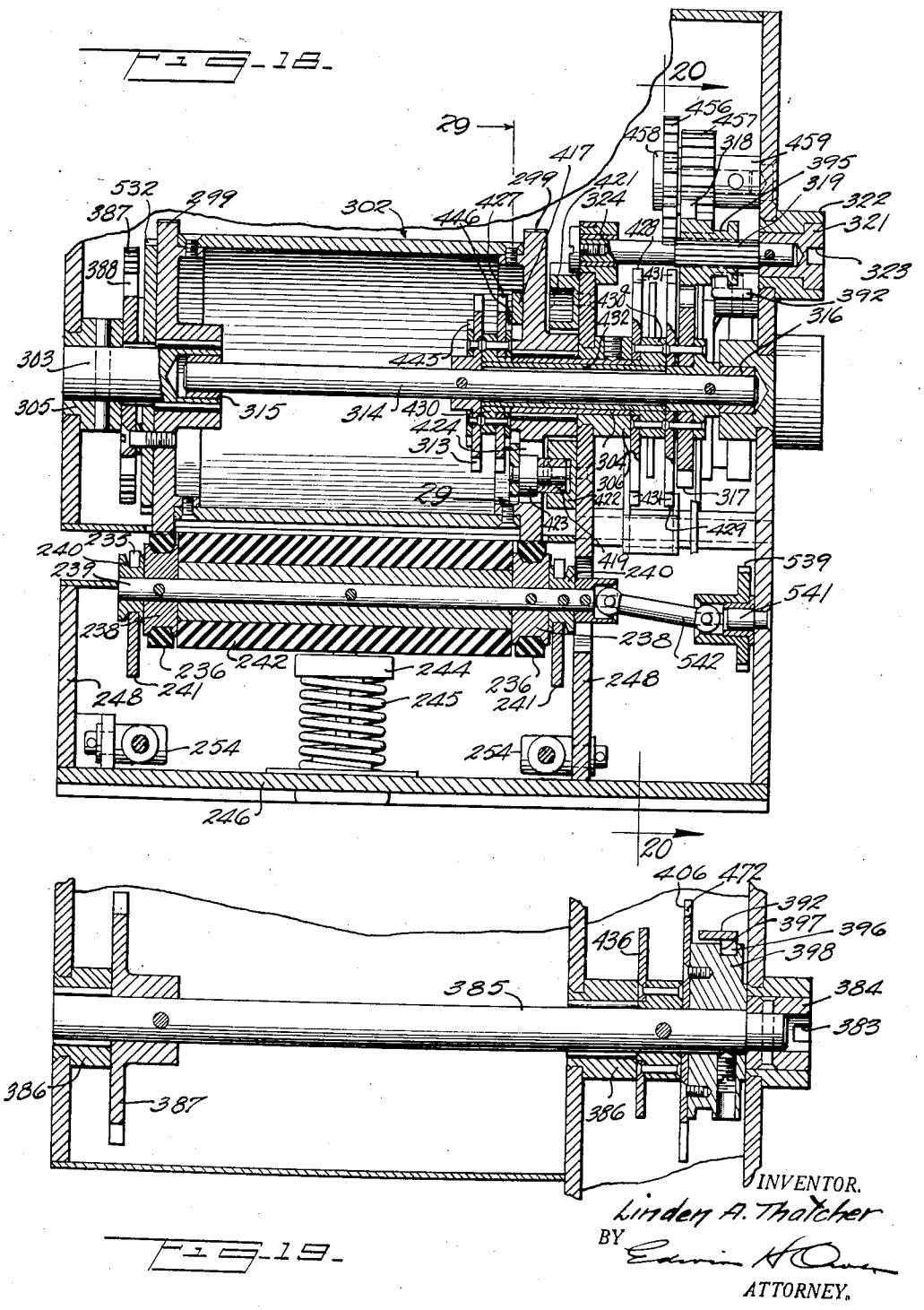

Aug. 22, 1939.  L. A. THATCHER  2,170,270
COIN OPERATED MAILING MACHINE
Filed Dec. 2, 1937  19 Sheets-Sheet 15
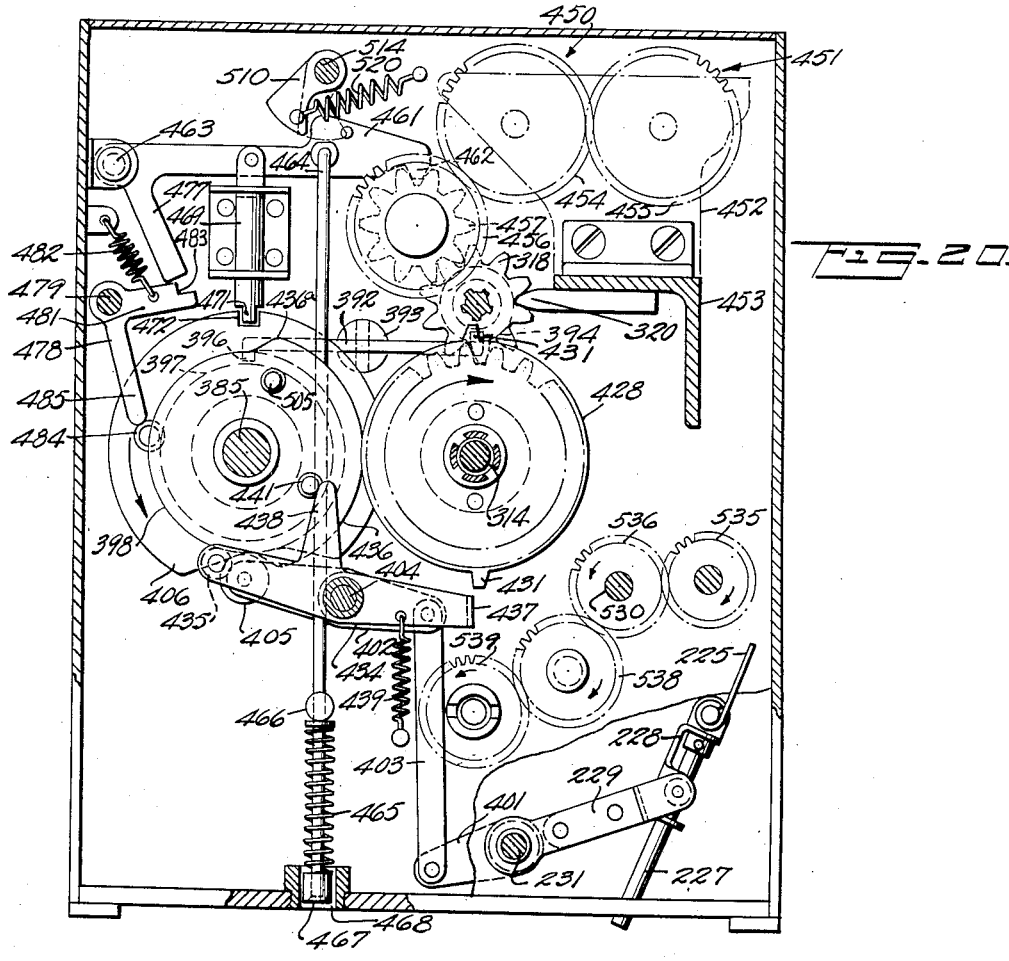
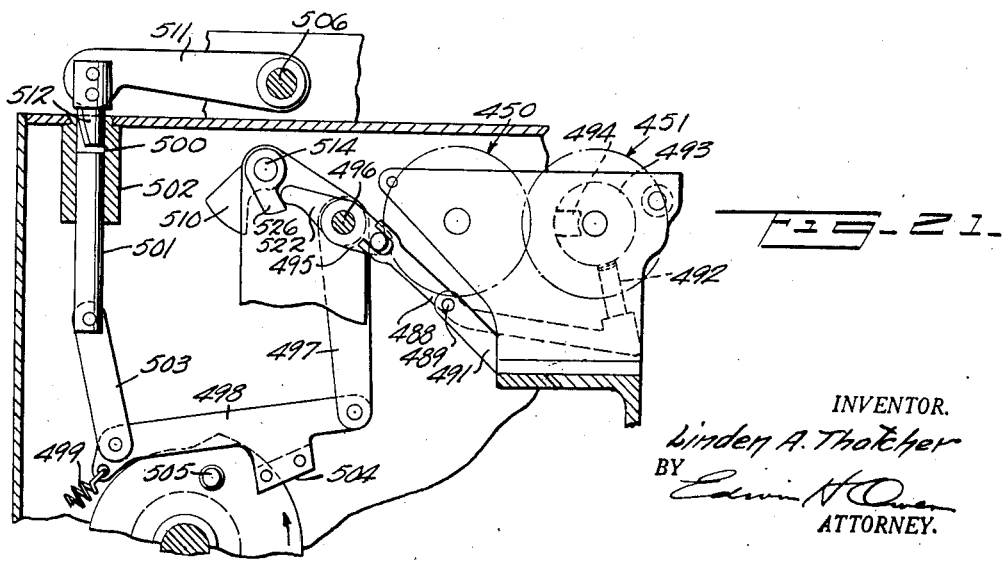
INVENTOR.
Linden A. Thatcher
BY
ATTORNEY.

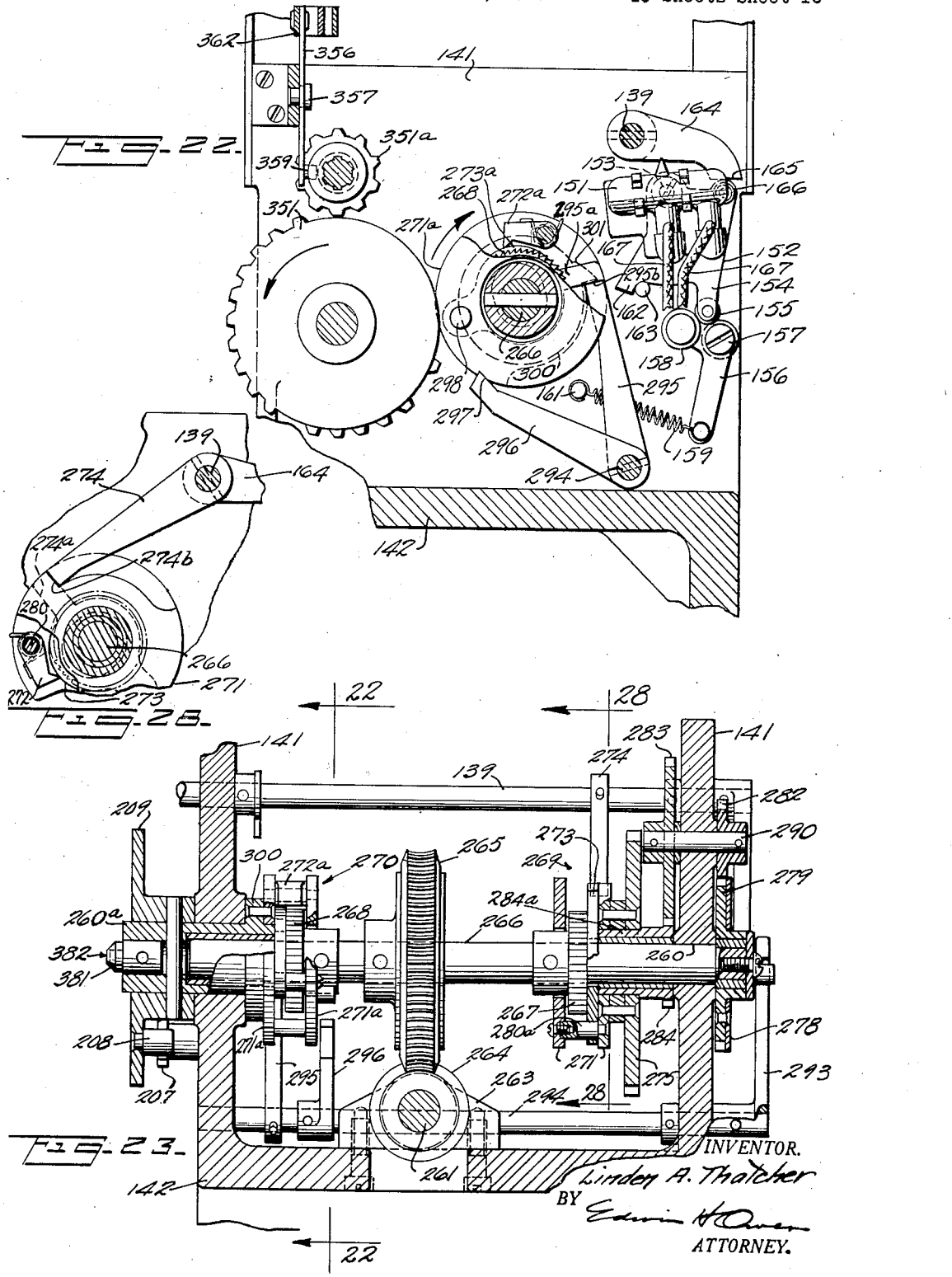

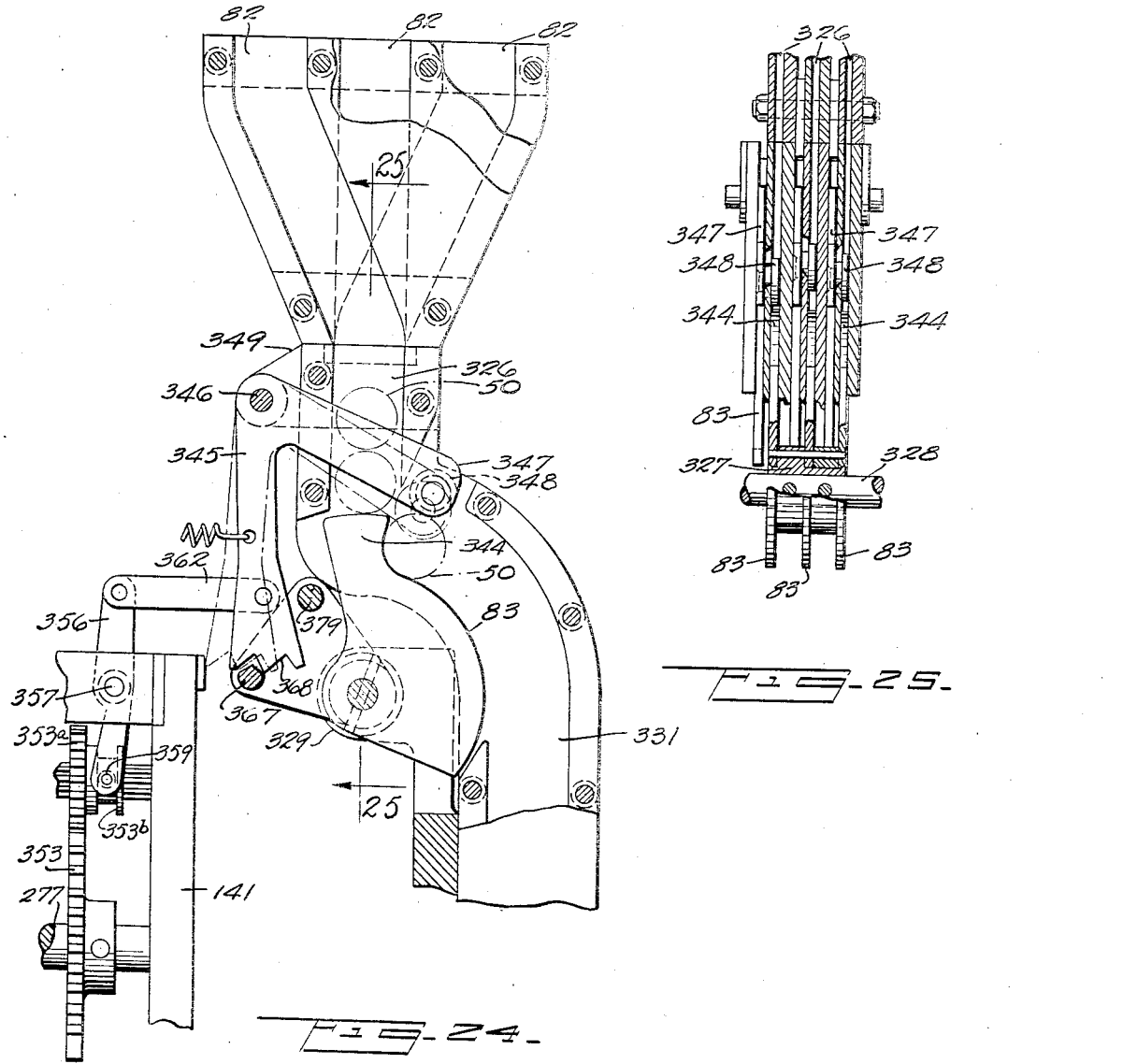

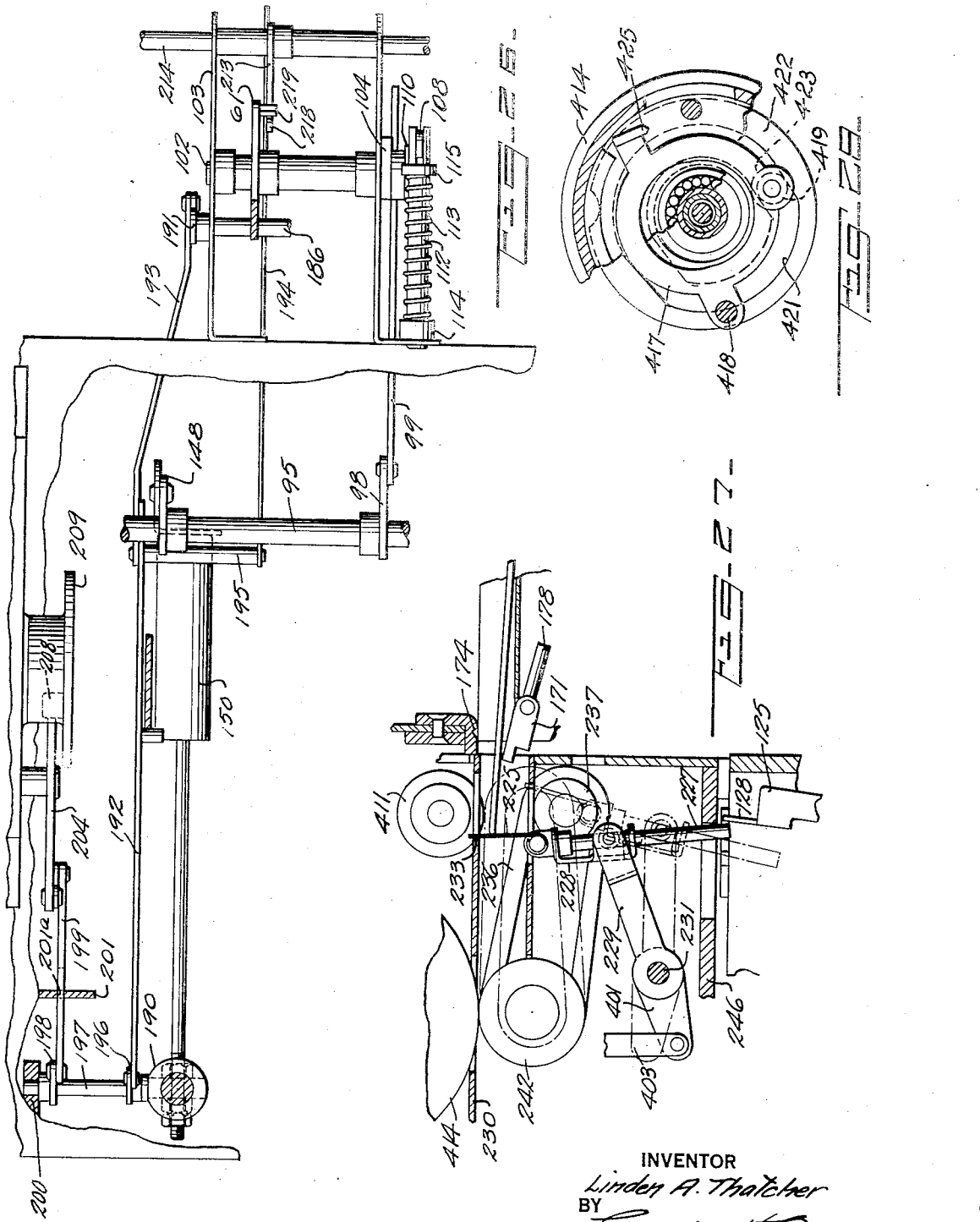

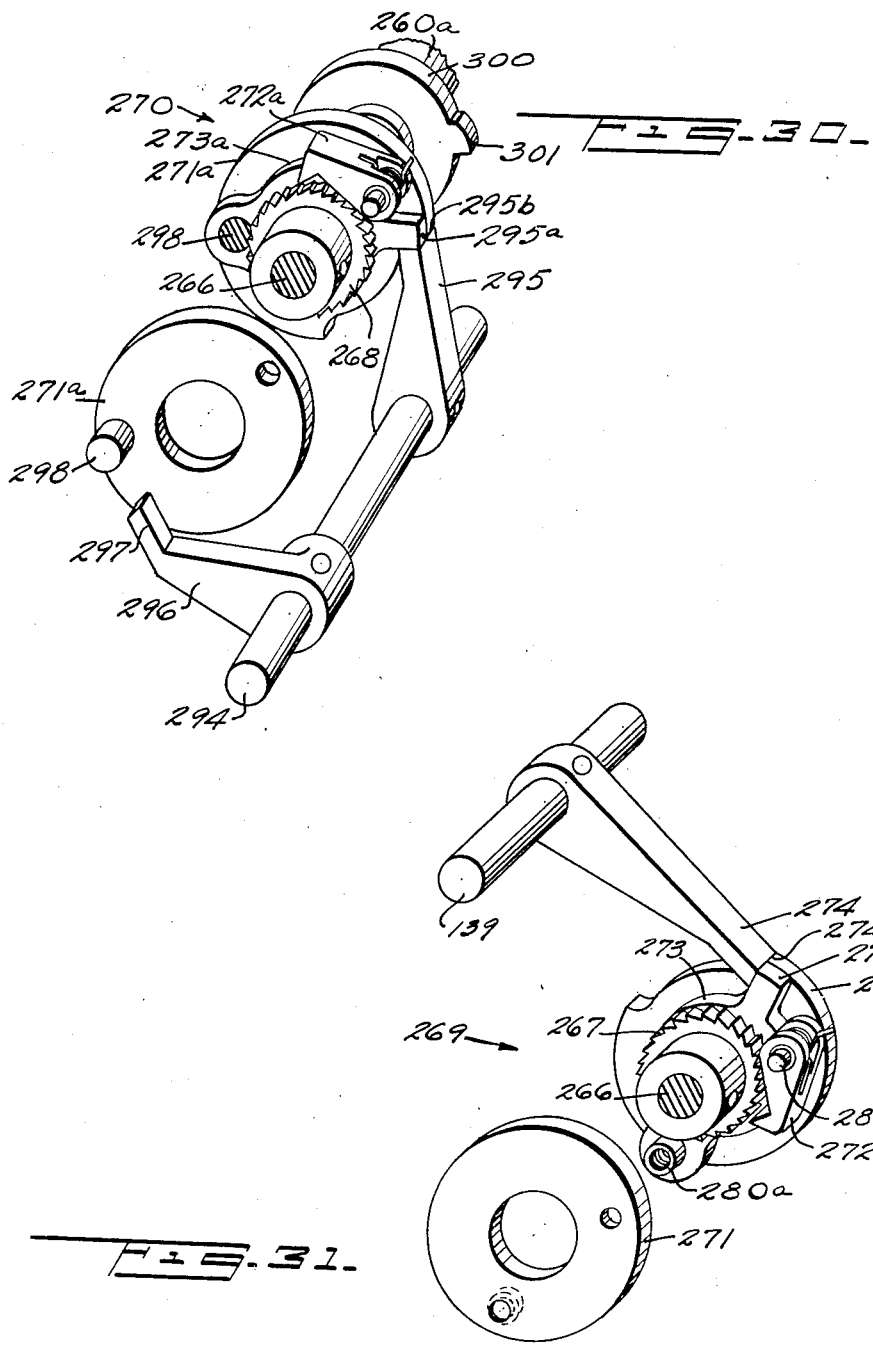

Patented Aug. 22, 1939

2,170,270

UNITED STATES PATENT OFFICE 2,170,270

COIN OPERATED MAILING MACHINE

Linden A. Thatcher, Coscob, Conn., assignor to Pitney-Bowes Postage Meter Company, Stamford, Conn., a corporation of Delaware Application December 2, 1937, Serial No. 177,671

23 Claims. (Cl. 194—83)

This invention relates to a coin operated mailing machine of a type which prints a value stamp impression upon the face of an envelope of a letter or like mail-matter in lieu of a postage stamp and which will register the value of said stamp impression in a registering device within the machine.

In the machine of this invention, one or more coins of a plurality of denominations are adapted to be inserted in the machine in accordance with the value of the stamp impression it is desired to have imprinted upon the mail-matter. Then, after performing a manual operation to pre-set the machine for its cycle of operation, a piece of mail matter, which will be hereinafter referred to as a letter, is inserted in the machine. The letter, upon insertion, will engage a trip device which will start the machine cycle of operation. Said machine operation includes the control or setting of value type devices in accordance with the value of the coins inserted, the setting of the said value in a registering device, the conveying of the letter to a printing position, the printing of the stamp impression upon the letter, the depositing of the letter within a receptacle inside the machine casing, and the returning of the value printing type to a zero position after printing is effected.

It is one object of this invention to provide in a coin operated mailing machine, means whereby the machine cycle of operation is started by the act of inserting a letter in the machine.

It is another object to provide a manipulative means for pre-setting the machine for a cycle of operation before a letter tripping operation can be effected and to prevent the moving of said manipulative means unless a coin has been inserted in the machine.

Another object is to provide means for receiving the total number of coins required for the desired value of stamp impression it is desired to print, and to provide for the operation on each coin of the group after the total number of coins have been deposited.

Another object is to provide an initial rest position for the coins behind a transparent member for the purpose of checking the accuracy of the coins inserted and further, to provide for the moving of the coins from the visible position to an operating position where each coin will function to control the setting of the value thereof in the printing and registering devices.

Another object is to provide for the continuous operation of the machine to complete both the coin controlled setting of the value printing members and the printing operation after the tripping of the machine is effected.

Another object is to provide means for conveying the letter to a printing position after a tripping operation is effected.

Another object is to provide a removable meter unit containing the registering and printing mechanism, and devices for preventing the insertion of further coins in the machine after a predetermined low value has been reached.

Another object is to provide a shutter to normally obstruct the path of the letter, and control devices operable to free said shutter during the pre-setting movement of the manipulative member.

Another object is to provide a control for the setting of the value type members of the printing device by means of driven variable toothed gear members and pinion members, the latter being movable into the path of said variable gear members under the control of the coins.

Other objects include the preventing of further manipulation of the manipulative member after the tripping of the machine is effected; provision of means for limiting the number of coins of any one denomination; provision of means for returning coins before the manipulative means is actuated for a pre-setting operation; controls for preventing the false operation of the machine, letter guides and controls associated with the tripping device, and improvements in coin operated machines.

With the foregoing and other objects in view which will appear as the description proceeds, the invention resides in the combination and arrangement of parts and in the details of construction hereinafter described and claimed, it being understood that various changes in the precise embodiment of the invention herein disclosed may be made within the scope of what is claimed without departing from the spirit of the invention.

A preferred embodiment of the invention is illustrated in the accompanying drawings, wherein:

Fig. 1 is a perspective view of the machine looking at the outer casing and showing the mail receptacle in an open position in dot dash line;

Fig. 2 is a front elevational view taken inside of the front panel of the casing showing generally the positions of the coin receptacle, the coin detectors and coin chutes, and further including the meter unit and mechanism for actuating said meter from the coin actuated means;

Fig. 3 is a side elevational view looking in the direction of the arrow 3 on Fig. 2 with the meter unit removed, parts being broken away and parts being shown in section;

Fig. 4 is a fragmentary detail view of a portion of the operating handle shown in Fig. 3 including the devices for providing a full stroke for the operating handle also a coin lock release;

Figure 13:
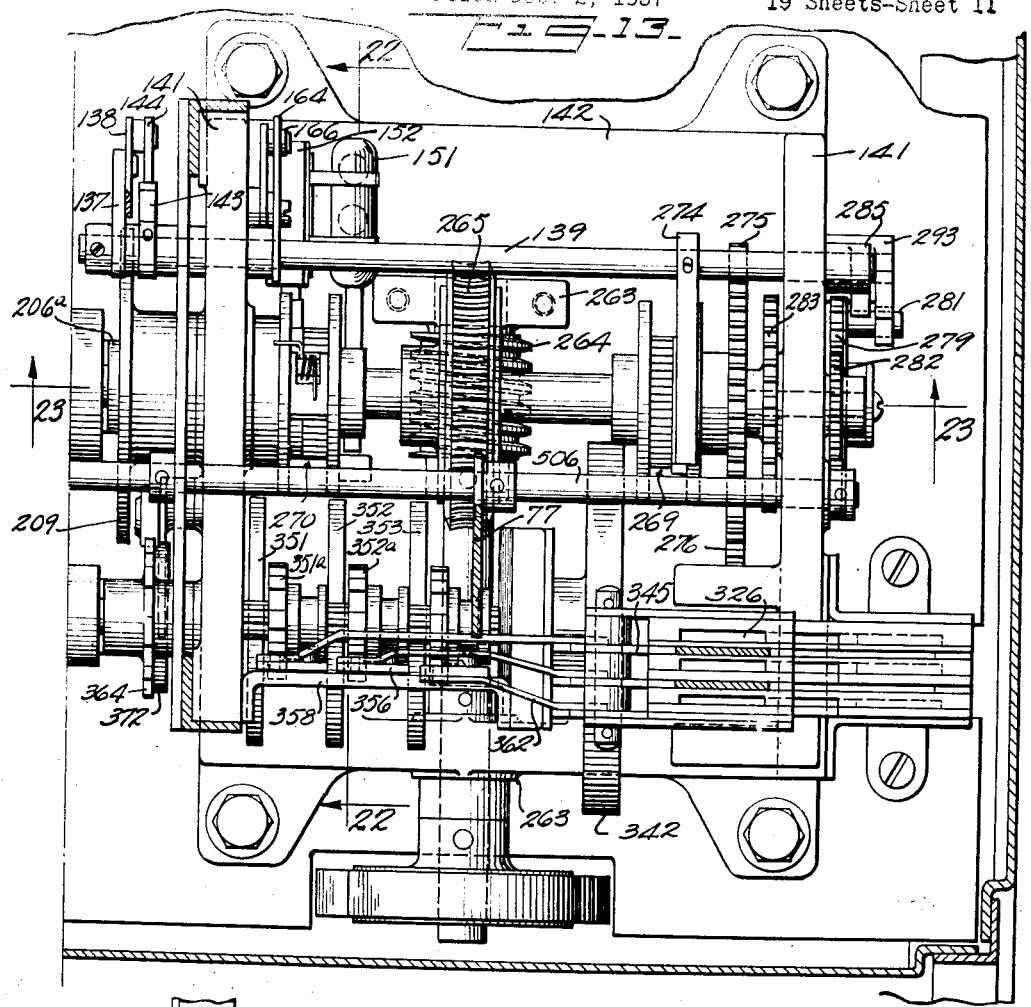
Figure 12:
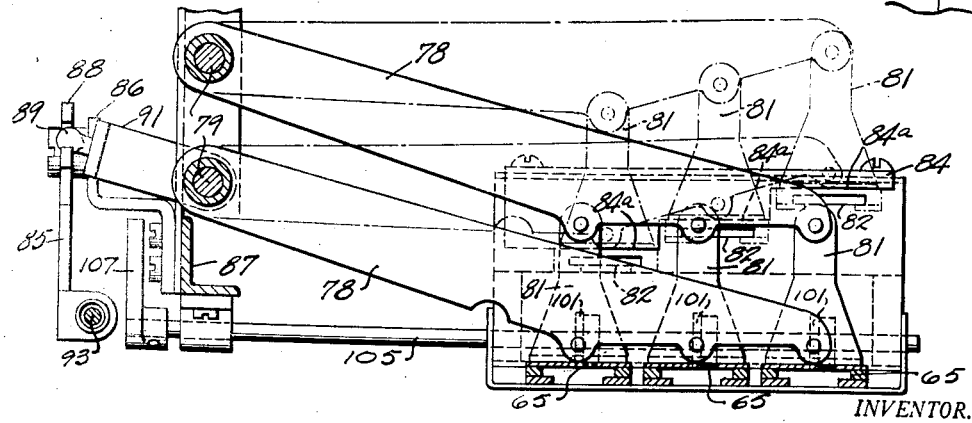
Figure 14:
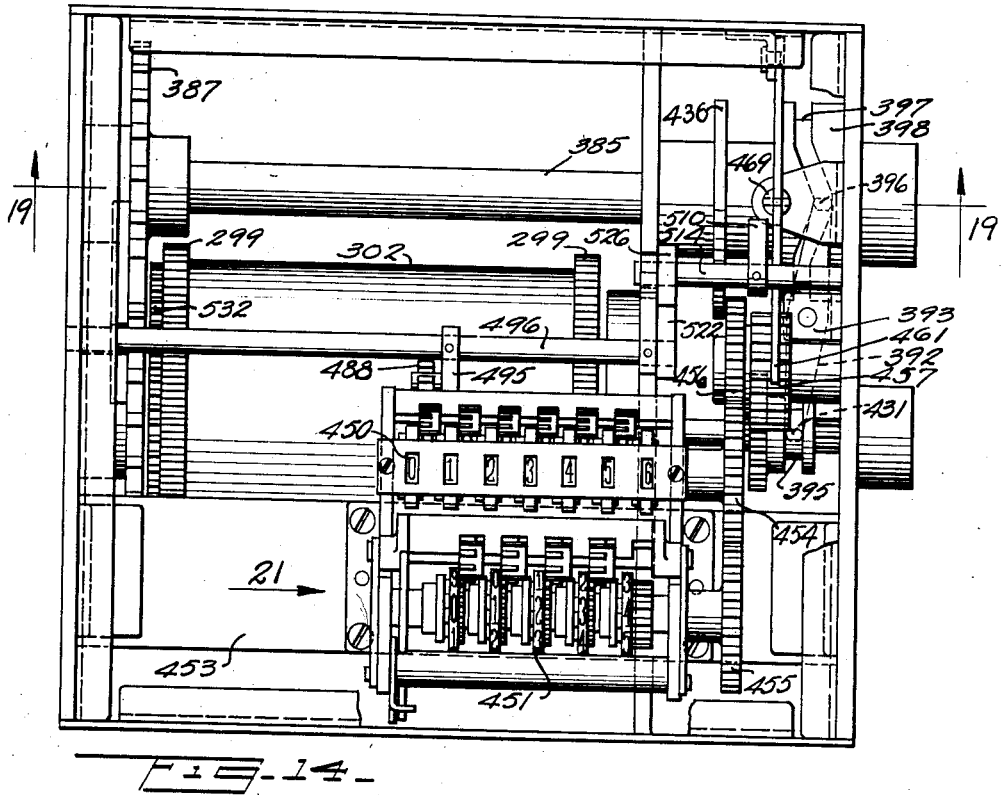
Figure 15:
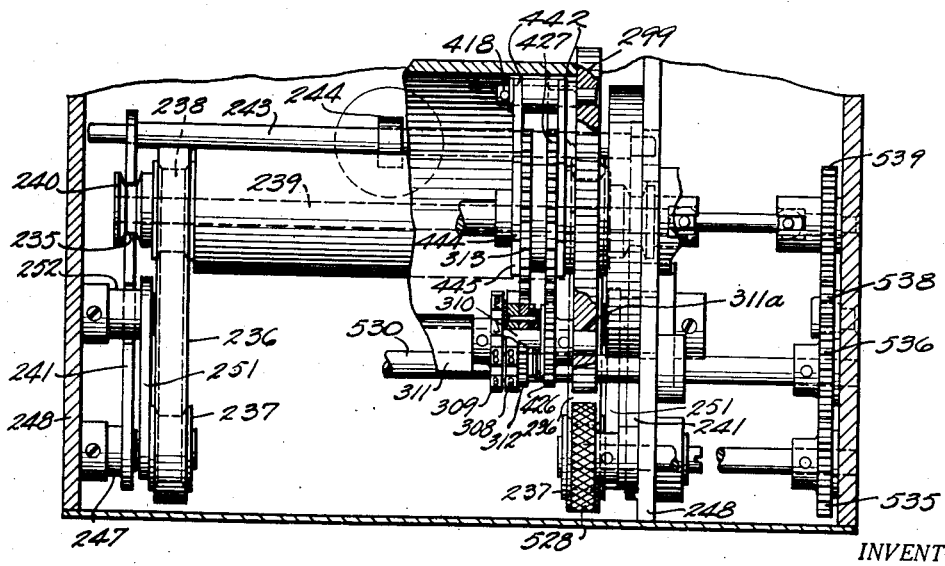

Figs. 5, 6, and 7 are enlarged views of the upper, the lower right and lower left hand portions of the structure shown in Fig. 2 on an enlarged scale and, when grouped together so that their dot and dash border lines coincide, the arrangement will be substantially that of Fig. 2;

Fig. 8 is an enlarged elevational view looking in the direction of the arrow 8 on Fig. 2, showing the upper portion thereof;

Fig. 9 is an enlarged elevational view looking in the direction of the arrow 9 of Fig. 2 showing the lower portion thereof, and when combined with Fig. 8 with the dot and dash lines coinciding, the two views make a complete enlarged side elevation of Fig. 2;

Fig. 10 is an enlarged view of the lower portion of Fig. 3 but with the meter unit included, and showing part in section and part in elevation;

Fig. 11 is an enlarged view of the lower portion of Fig. 10 showing various locking and latching mechanism which are associated with the manually actuated handle;

Fig. 12 is a plan sectional view taken on the line 12—12 of Fig. 5 and showing the coin chute shifting mechanism;

Fig. 13 is a plan sectional view taken along the line 13—13 of Fig. 6 and showing the main drive and clutch operated mechanisms;

Fig. 14 is a plan view taken along the line 14—14 of Fig. 7 looking into the meter unit;

Fig. 15 is a plan sectional view looking in the direction of the arrow 15—15 on Fig. 7 and showing a portion of the printing type wheel drive within the printing drum, also the impression roller;

Fig. 16 is a vertical sectional view taken along the line 16—16 of Fig. 7;

Fig. 17 is a side elevational view of an intermittent drive taken as a section along the line 17—17 of Fig. 7;

Fig. 18 is a vertical sectional view through the meter unit taken along the line 18—18 of Fig. 16;

Fig. 19 is a vertical section taken along the line 19—19 of Fig. 14;

Fig. 20 is a vertical sectional view taken along the line 20—20 of Fig. 18;

Fig. 21 is a fragmentary detail view showing the counter lockout mechanism which is taken in the direction of the arrow 21 on Fig. 14;

Fig. 22 is a vertical sectional view taken on the line 22—22 of Figs. 13 and 23;

Fig. 23 is a vertical sectional view with part in elevation taken along the line 23—23 of Fig. 13;

Fig. 24 is a fragmentary elevational detail of a portion of the mechanism shown in Fig. 6 and showing an oscillating arm operating upon a coin;

Fig. 25 is a vertical sectional detail taken along the line 25—25 of Fig. 24;

Fig. 26 is a plan sectional view with part in elevation taken along the line 26—26 of Fig. 11;

Fig. 27 is a fragmentary detail view with part in section of a part of the mechanism shown in Fig. 16, and showing the parts in a position at the time of tripping when inserting a letter in the machine;

Fig. 28 is a vertical sectional view taken along the line 28—28 of Fig. 23; and

Fig. 29 is a vertical sectional view taken along the line 29—29 of Fig. 18.

Figs. 30 and 31 respectively are perspective views of the clutch members.

*General description*

In general, the machine of this invention is provided for the purpose of mailing a letter and during the process of mailing said letter means is provided for the printing of a stamp impression upon the letter in accordance with the rate of postage. The machine is coin controlled and each stamp impression will have a value imprint which will be determined by the value of the coin or coins inserted in the machine.

One or more coins agreeing with the value of the stamp impression, which is to be applied to the letter, are inserted in the machine, which coins will fall into a visible compartment for the purpose of permitting a check to be made of the coins, also to discourage the use of fraudulent coins. After checking the coins in the visible compartment, to determine their accuracy, a lever is drawn forward by the operator to permit the coins to move to an operating position and to pre-set the machine for a cycle of operation.

The letter is next placed upon a platform face up with the right edge thereof engaging a side guide, and is then forced forward into the machine, whereupon the leading edge thereof will engage a tripping device to thereby start the machine cycle of operation.

During the machine cycle of operation the coins will be acted upon by a series of oscillating members and through a variable toothed gear drive and pinion shifting devices, will set up the value of the total member of coins in the printing type wheels to a value agreeing with the value of the coins inserted in the machine. Also, in addition to setting up the value in the printing type wheels, the said value is set up in a register device.

After the amount has been set up in the printing device and register, the letter, which is momentarily held in its initial tripping position, is drawn into the machine by means of a conveyor mechanism, while at the same time the printing drum of the printing device is rotated to permit the printing type members to engage the upper right hand corner of the letter to impress a stamp thereon. At the end of a machine cycle of operation the machine parts are restored to their normal positions.

If after inserting several coins into the machine, but before starting a machine cycle of operation, it is discovered that an error has been made, the coins may be returned by means of a manually actuated button which may be depressed by the operator.

The registering and printing devices are mounted within a so-called meter unit, which unit is adapted to be detached from the machine for the purpose of permitting the same to be taken to the postoffice for the setting of a subtracting register, by an authorized official, to a value agreeing with a predetermined total value of stamped impressions. The subtracting register is also provided with means for discontinuing the operation of the machine after the register has reached a certain predetermined low value.

Referring now to the drawings in detail the outside casing of the machine is generally shown in Fig. 1, and comprises a casing 51, which is provided with a platform 52 upon which a letter is normally supported before it is inserted into the machine.

Within the lower area of the casing 51 is a letter receptacle 53, which is hinged at 54 to permit it to be rocked outward to the dot and dash line position shown, for the purpose of collecting of the letters which will have dropped therein during each machine cycle of operation.

At the upper portion of the casing 51, a coin receptacle 55 is provided which has openings 56 therein to provide for the insertion of a plurality of coins 50 of a plurality of denominations such as the one cent, five cent, and ten cent denominations for example. Below the coin receiving compartment 55 and a little to the right thereof, is a unit 57 which is visible to the operator and which is adapted to receive the coins for display after they have passed through the openings 56, to permit the operator to check for accuracy the total number or value of the coins inserted. By means of such a coin display it is also possible for other persons, such as inspectors, to view the coins inserted in the machine, for the purpose of detecting spurious coins.

Below the visible unit 57 is a coin return pocket 58 through which coins are adapted to be returned before a machine cycle of operation has started if an error is made in depositing coins, a manually operated button 59 being provided for the convenience of the operator in returning the coins.

Projecting above the platform 52 is a handle 61a which forms part of a manual control lever 61, and is adapted to be grasped and pulled forward, by the operator after the proper coins have been inserted, to thereby pre-set the machine for the machine cycle of operation.

Within the left side wall as viewed from Fig. 1, a door 62 is provided in the casing, through which a meter unit, which will be later described, is adapted to be inserted or withdrawn.

*Coin receiving devices*

The coins, after passing through the openings 56, Figs. 1 and 5, will pass through coin slots 63, then through suitable coin detectors indicated generally at 64, then into coin chutes 65. The lowermost coins will finally land upon a shelf 66, Figs. 5 and 8, which is formed along the upper end of a rocker plate 67, said plate having arms 68—68 bent inward and pivotally connected at 70 to a stationary supporting frame structure 69.

The upper ends of the chutes 65 are flared outward, as shown at 71, to provide a suitable mouth for the passage of the coins from the detectors 64 to the chutes 65. The first coin passing through any coin chute 65 will engage the said shelf portion 66. Here it will remain at rest and form a stop for the next coin passing through the chute. The coins are stacked in a vertical position, one resting upon the other as illustrated in Fig. 5. While the coins remain in this vertical position, they are visible to the operator and are positioned in alignment with a return slot 60, through which the coins may be returned if desired before the machine cycle of operation has started.

For the convenience of the operator in returning the coins, the aforesaid push button 59 is provided above the coin return pocket 58. Said push button comprises a plunger pin which is slidably mounted within a bearing 72 secured within the front wall of the casing 51, the inner end of which pin is adapted to engage a downwardly projecting lug 73 formed on the rocker plate 67. When the push button is depressed, the rocker plate 67 will be rocked about its pivot 70 to withdraw the shelf portion 66 from its engagement with the lowermost coins in the coin chutes 65, thereby permitting the coins to drop by gravity through the return slot 69. One arm of the rocker plate 67 has a rearward extension as indicated at 68a, in Fig. 8, and has a spring 74 secured to the outer end thereof to urge a pin 75 therein into engagement with a cam surface 76 of a lever or cam member 77. Said cam member is provided to rock the rocker plate 67 for a purpose to be later described.

The three coin chutes 65 are supported on two pairs of parallel arms 78—78, Figs. 5 and 12, which arms have one end secured to vertical support rods 79—79, rotatably mounted in suitable bearings 80. The opposite ends of said arms 78—78 are pivotally secured to brackets 81 extending rearwardly from the coin chutes.

*Moving coin chutes to direct coins to operating position*

The coin chutes 65 are adapted to be moved rearward from the full line position of Fig. 12 to the dot and dash line position, after the coins have been inserted, to thereby align the coin chutes 65 with three stationary coin guides 82 through which the coins will be directed to a coin operating position. On passing through said coin guides 82, the coins will be directed to a position, as best shown in Fig. 6, where they will be arranged in three separate rows, with one row directly behind the other in vertical alignment, and with the lower coin of each row resting upon a coin actuating member 83, there being one actuating member for each row of said coins.

A stepped back-stop 84 having three steps 84a, is provided as shown in Fig. 12, to provide an abutment for the coin chutes 65 and consequently to provide for aligning the lower portion of each of the coin chutes 65 with the stationary coin guides 82. To move the lower ends of said coin chutes 65 back against the stepped back-stop 84, the arms 78—78, which are attached to the coin chutes 65, are rocked about their pivot rods 79 by means of a forked bell crank 85, Fig. 10. Said bell crank 85 is pivotally mounted upon a bracket 86, fixed to the stationary frame structure 87, and has one forked arm 88 engaging a projecting end 89 of an arm 91 fixed to one of the vertical rods 79. The opposite arm 92 of said bell crank 85 is yieldably secured to the upper end of a vertically disposed rod 93, which rod has its lower end connected with a lever 94, which is fixed to a rock shaft 95. Said rock shaft 95 is suitably mounted in bearings 96 extending below the lower surface of a bed plate 97, which bed plate forms the main support for the operating mechanism.

*Pre-setting lever*

The rocking of the rock shaft 95 is controlled by means of the aforementioned manual control or pre-setting lever 61. Said lever 61 is fixed to a shaft 102, as best shown in Figs. 2 and 11, which shaft is supported in suitable bearings provided in side plates 103—103 projecting forwardly of and secured to the bed plate 97. Another lever 98, which is secured to shaft 95, is connected with a short lever 104 on the shaft 102 by means of a link 99, as best shown in Fig. 11, said link having an elongated slot 99a therein to permit the return of the setting lever 61 from the pre-setting or full line position of Fig. 10, to the normal or dot and dash line position.

When pulling the setting lever 61 from the dot and dash line position of Fig. 10 to the full line position, the shaft 102 is rocked, which movement will rock the lever 104 and through the link 99 will cause the rock shaft 95 to be rocked in a clockwise direction. This movement will cause the lever 94 to be rocked downward, as in Fig. 10, and thus exert a downward pull upon the rod 93 which in turn will cause the bell crank 85 to be rocked in a clockwise direction to rock the coin chute shifting arms 78—78 to the dot and dash line position of Fig. 12.

A yieldable spring connection, indicated generally at 106, is provided at the upper end of the rod 93 to permit a greater movement of the rod 93 than that required to bring the coin chutes 65 backward against the back stops 84, thus assuring that the said chutes 65 will have moved the full distance.

After pulling the handle 61 to the extreme forward position, as indicated by the full lines of Fig. 10, said lever 61 is spring returned to its normal position. The means provided for said return includes a lever 108, Figs. 10 and 2, which is pivotally mounted on a stud 109, secured in one side plate 103, which is connected with a short lever 110 at 111, the lever 110 being fixed to the setting lever shaft 102. The upper end of the lever 108 is connected to the forked end of a plunger rod 112 and is normally urged outward to its dot and dash line position by means of a spring 113, around said rod which is compressed between a stationary collar 114 and a collar 115 on the rod 112. It will thus be seen that after pulling the setting lever 61 forward to the full line position of Fig. 10, the lever 108 will be rocked in a counterclockwise direction to thereby cause the spring 113 to be compressed and upon reaching the full stroke, the spring 113 will cause the lever 108 to be rotated in an opposite direction and consequently return the setting lever 61, to its normal position.

Means is also provided for insuring the full stroke of the setting lever 61, which means is illustrated in Fig. 4 and comprises a ratchet plate 117 fixed to one of the side plates 103, and pawl 118 pivotally mounted at the lower end of a downwardly projecting arm 121, formed as a part of the handle 61, which pawl is adapted to be wiped across the ratchet teeth 117a on the ratchet plate. Said pawl 118 is maintained in contact with the ratchet teeth through the pull of a spring 119. The arrangement is such that if the handle is released before a full stroke is completed, the pawl 118 will become jammed between the ratchet teeth and thereby prevent further return movement of the handle.

As best shown in Fig. 4, means will be found for normally preventing the pulling of the setting lever 61, which means comprises a stop arm 120, mounted on a shaft 122 suitably supported under the bed plate 97, and having its free end projecting into the path of a stop pin 123 at the lower end of the arm 121. Said stop arm 120 will remain in its locking position unless there is a coin present in at least one of the coin chutes 65. Referring to Fig. 8, if a coin is present in the lower end of the coin chute 65 and resting upon the shelf 66 as shown, it will be noted that the lower end of the coin is directly in the path of the nose portion 100 of a finger 101. One finger is provided for each of the three coin chutes and said fingers are fixed to a shaft 105 rotatable in suitable bearings on the frame structure. See also Fig. 5. At the left end of the shaft 105 as viewed from Fig. 5, a lever 107 is mounted which lever is connected with another lever 148a on the shaft 122 by means of a link rod 149, as shown in Figs. 2 and 4.

When there is at least one coin in one of the coin chutes and the setting lever 61 is pulled forward, the coin chutes 65 will move rearward. The coin or coins which rest upon the shelf 66, will act as an interponent to engage the nose portions 100 of the fingers 101 to thereby rock the shafts 105 and 122. If there are no coins present in the coin chute, there will be no interponent to move the fingers 101, and after a slight movement of the setting lever 61 the stop pin 123 will engage the end of the stop arm 120.

The object of pulling the setting lever 61 is to pre-set or prepare the machine for a tripping operation. When the parts of the mechanism are in the position shown in Fig. 3 they are in a normal rest or non-operating position, and when said parts are moved to the position shown in full lines of Fig. 10, they are in their pre-set or pre-operating position ready to move through a cycle of operation after the final tripping operation is effected by the insertion of a letter in the machine. The lever 61 will always return to the dot and dash line position of Fig. 10 after it is released and before a trip is adapted to be effected.

It is to be understood that upon pulling the setting lever 61 forward, certain combinations of mechanism are set up which will later function in a definite timed order to produce a complete machine operation. The various combinations which are set up will next be described.

*Pre-setting of latch mechanism*

The first combination to be considered will be the pre-setting or latching of certain parts of the mechanism which are to be later released through the act of inserting a letter in the machine to trip same.

As best shown in Figs. 3 and 10, the trip mechanism includes a latch lever 125, which is controlled by the letter trip, and is freely mounted upon a stud 126, said stud being supported by a bracket 127, Fig. 2. The upper end of said lever 125 is provided with a sidewardly disposed blade 128. To one side of said trip lever 125 is a safety latch lever 129, which is controlled by the manual pre-setting lever 61. Said lever is also freely mounted upon the stud 126 and has a downwardly projecting arm 132. The latch lever 125 is normally urged inward to a latching position by means of a spring 124 and the latch lever 129 is normally urged to a latching position by means of a spring 130, as shown in Fig. 3.

A link 133, has a loose connection at one end with the arm 132 of the latch lever 129 and has its opposite end connected with a downwardly projecting arm 116 of the lever 108. Cooperating with the latch levers 125 and 129 is a lever 134 which is fixed to the rocker shaft 95. The free end of said lever 134 has an enlarged head portion 135 which is adapted to be engaged by one or both of said latch levers 125 and 129 in a manner and for a purpose to be later described.

An arm 136, also attached to the rock shaft 95, is linked with another lever 137 by means of a link 138, said lever 137 being freely mounted on a rock shaft 139 which is associated with the clutch control and drive mechanism, to be later described. As best shown in Fig. 13, said rock shaft 139 is supported between two walls 141—141 of a support 142 which carries the said drive mechanism. A pawl 143, Fig. 10, is fixed to one end of said shaft 139 and has the free end thereof extending into the path of a latch lever 144, which latch lever is pivotally mounted at the upper end of the link 138.

While the parts are in the normal rest position of Fig. 3, the lever 134 is in a non-latched position with relation to the latch levers 125 and 129, also, pawl 143 is in a non-latched position with relation to a lug 145 on the latch lever 144. When however, the setting lever 61 is pulled forward to the position shown in full lines of Fig. 10, the lever 108 will be rocked counter-clockwise around its pivot 109 to cause the link 133 to be moved toward the right or the full line position shown in Fig. 10, and thereby allow the latch lever 129 to move to a latching position under the influence of the spring 130. Also, when said setting lever 61 is pulled forward, the rock shaft 95 is rocked through the medium of the link 99 and lever 98 in a manner previously described, to thereby rock the head portion 135 of the lever 134 downward sufficiently to become latched by the latch levers 125 and 129. Further the rocking of said rock shaft 95 will cause the link 138 to be moved upwardly to thereby move the lug 145 of the lever 144 past the pawl 143 into a position where it will be engaged in a latched position by the said pawl, as shown in Fig. 10. By means of a spring 140 the lever 144 is urged to move the lug 145 into a latched relation with the pawl 143.

During the return of the setting lever 61 from the full line position of Fig. 10, to the dot and dash line position, the various parts of the mechanism will remain in the full line position shown in Fig. 10, with the exception of the latch lever 129. Said lever will be rocked to the dot and dash or unlatched position. The head portion 135 will therefore continue in latched relation with only the letter controlled latch lever 125 after the pre-setting operation is completed. By means of a spring 146 which is stretched between an anchor pin 147 and a lever 148, fixed to the rocker shaft 95, the head 135 of the lever 134 will be held under tension against the latch lever 125.

It is to be noted that since the lever 148 is fixed to the rock shaft 95, the said rock shaft becomes a spring loaded shaft, and that when the latch lever 125 is tripped the tension of the spring 146 will cause the rock shaft 95 to be rocked about its pivot in a counter-clockwise direction as viewed from the position of Fig. 10. The rocking of the shaft 95 will also cause the link 138 to be moved downward and through the latched engagement of the pawl 143 with the lug 145 of the latch lever 144, the shaft 139 will be rocked in a counter-clockwise direction.

A dash-pot type of structure is provided to retard the action of the spring 146, when the latch 125 is tripped, to thereby prevent an abrupt action of the various parts which are effected by the rocking of the rock shaft 95. Said structure comprises a piston chamber 150 pivotally secured to the arm 148 and a piston 160 slidable within said piston chamber 150 and fixed to the lower end of a support 169 projecting downwardly from the bed plate 97.

Pre-setting of motor drive switch

Referring now to Fig. 22, a mercury switch 151 is shown mounted upon a bracket 152, which bracket is pivotally mounted at 153 on one wall 141 of the support 142. Said bracket 152 has one arm 154 projecting downwardly therefrom which arm has a roller 155 rotatably mounted thereon. Below said arm 154 is a bell crank 156 pivoted on a stud 157, and having a roller 158 rotatably mounted upon one arm thereof, which roller is maintained in engagement with the roller 155 on the bracket 152 by the action of a spring 159, stretched between the opposite arm of said bell crank 156 and an anchor pin 161. The arrangement is such that the roller 158 is urged against the roller 155 to normally cause a lug 162 on said bracket 152 to engage a stop pin 163, which projects from the wall 141, to thereby normally maintain the mercury switch in an open contact position.

By means of a lever 164, which is fixed to the rock shaft 139 previously described, and which has a striker portion 165 normally engaging a roller 166 on the upper portion of the bracket 152, the said bracket 152 is adapted to be rocked about its pivot 153 when the shaft 139 is rocked to move the mercury switch to a closed contact position. The movement of the bracket 152 is limited by the engagement of the arm 154 with the stop pin 163. It will be noted that the bell crank member 156 will function as an off-center spring engaging member, through the engagement of the roller 155 with either side of the roller 158, and will retain the mercury switch in either an open or closed contact position. The terminals 167—167 which are attached to the mercury switch 151 are connected with a motor 168 shown in Fig. 6 and through connection with suitable power means the motor will run when contact is made in the mercury switch.

Operation of letter shutter

As previously stated, the actual tripping operation is accomplished by the insertion of a letter into the machine. Referring to Fig. 16, it will be seen that the normal passage of a letter into the machine is prevented by means of a shutter member 171, which is normally maintained in a fixed position before the pre-setting lever 61 is moved through its pre-setting operation. Said shutter is pivotally mounted upon a shaft 172, supported in suitable bearings provided in side wall members 173, the upper edge thereof being normally engaged within a notched portion 174, provided along the under surface of the upper wall of the opening through which the letter is passed, and being normally held against said notched portion 174 by means of a spring 175 which is stretched between a pin 176 projecting from said shutter 171 and an anchor pin 177 projecting from the front wall of the casing.

A tail pin 178 projects below the shutter member 171, which pin is normally in engagement with an abutment 179 formed on a lever 181. Said lever 181 is pivotally mounted upon a pin 182 and has one end or arm 183 projecting downward and normally bearing against a pin 184. Said pin 184 is carried by a lever 185, which lever is mounted upon a shaft 186 supported by the aforementioned side plates 103 and further has another pin 188 positioned at the outer end thereof. According to the position of the parts as shown in Fig. 16, the shutter 171 will remain in its closed position so long as the tail pin 178 engages the abutment portion 179 of the lever 181.

When the setting lever 61 is moved forward during its pre-setting operation, the lever 185 is rocked in a clockwise direction to cause the pin 184 to rock the arm 183 of the lever 181 and thereby remove the abutment portion 179 from its contact with the tail pin 178. Upon further movement of the lever 185 the pin 188 will engage said tail pin 178 and thereby rock the shutter 171 about its pivot in a counter-clockwise direction against the pull of the spring 175.

The means provided for rocking the lever 185 is best shown in Figs. 11 and 26. Said means includes a lever 191, secured to the shaft 186, which lever is connected with a slide bar 192 by means of a link 193. Said link 193 is further connected with another slide bar 194, there being a common connection in the form of a stud 195, which connects each of the slide bars 192 and 194 with the link 193. Positioned between the link 193 and the slide bar 194, is the previously mentioned lever 148, which lever is shown in Figs. 10 and 11, and is adapted to be rocked clockwise about its pivot or rock shaft 95, when the setting lever is pulled to the forward or full line position. Upon assuming the position shown in Fig. 10, said lever 148 will have engaged the stud 195 which connects the link 193 with the slide bars 192 and 194, Fig. 11, and will have thereby caused said link 193 to have been pulled toward the left, as viewed from said Fig. 11, which in turn will have rocked the lever 191 and the shaft 186 to which it is attached, in a clockwise direction.

Referring again to Fig. 16, it will now be seen that the rocking of the shaft 186 in a clockwise direction will also cause the lever 185 to be rocked in a clockwise direction, thereby causing the pin 184 to rock the lever 181 and release the abutment 179 from engagement with the tail pin 178, and further, will cause the pin 188 to engage said tail pin and rock the shutter 171 to an open position. The lever 148 will remain in the rocked or full line position, shown in Fig. 10, after the setting lever 61 is released and is permitted to return to its normal position or dot and dash line position of Fig. 10, due to the latched engagement of the latch lever 125 with the lever 134, as previously described.

Upon moving the stud 195, by means of the engagement of the lever 148 therewith, the slide bar 192 will, through its engagement with another lever 196, cause a shaft 197 to be rocked.

The shaft 197 is supported in suitable brackets 190 and 200, depending from the base 97. Also attached to said shaft 197 is another lever 198, which lever has attached to the upper end thereof a slide bar 199. Said bar 199 is guided within a slot 201a in a bracket 201 and has a tooth or lug 202, having one cam surface 203 which is adapted to ride over the lower wall of the slot 201a, when the lever 198 is rocked to the left of the position shown in Fig. 11, through the rocking action of the shaft 197. By means of said rocking action, said lug 202 is moved to the opposite side of the bracket where it will become latched against said bracket.

Due to the latching of the lug 202 against the bracket 201, the slide bars 192, 194 and link 193 will remain in a fixed position to hold the shutter 171 in its open position until the end of the machine cycle of operation.

To release the slide bar 199, after a machine cycle of operation, one end thereof is linked to a lever 204 by means of a link 205, said lever 204 being pivotally mounted upon a stud 206 and having one end 207 projecting into the path of a striker pin 208, projecting from a disc 209, which disc forms a part of a clutch member 210, to be later described. The arrangement is such that when the disc 209 has completed a revolution, the striker pin 208 will have engaged the arm 207 to rock the lever 204 about its pivot 206 in a clockwise direction, and thereby lift the lug 202 on the slide bar 199 from its latched engagement with the bracket 201.

Having thus released said slide bar 199, the slide bar 192 will move to its normal position through the action of a spring 211, which is stretched between an anchor pin 212 and a pin 213 on the slide bar 192. The movement of said slide bar 192 will also move link 193, which in turn will rock the lever 191 and the shaft 186, also the lever 185, Fig. 16, to their restored or normal positions. Through the action of the spring 175, the shutter 171 will be restored to its closed position with the tail pin 178 locked behind the lug 179 of the lever 181.

*Locking setting lever after setting*

As best shown in Fig. 11, means is provided for latching the setting lever 61 after it has returned from the forward or pulled position of Fig. 10 back to the normal position of Fig. 11, the purpose being to prevent any further manipulation of said setting lever 61 after it has returned to its normal position.

Said means comprises a latch lever 213 which is pivotally mounted upon a stud 214 fixed in plate 187, said latch lever having one arm 215 which is secured to the free end of the slide bar 194. A lost motion connection is provided by means of a pin 216 on said arm 215 which engages an elongated slot 217 in the slide bar 194, by means of which connection the arm 215 is freely movable with relation to the slide bar 194, within the limits of the elongated slot. Said latch lever 213 is also provided with a hook 218 which is adapted to be moved into engagement with the pin 123, projecting from the downwardly extending arm 121 of the setting lever 61. The latch hook 218 and the previously described arm 120, Fig. 4, are in substantial alignment.

It will be seen, that after the setting lever 61 has been drawn forward, which movement will cause the slide bar 194 to be moved to the left of the position as viewed in Fig. 11, the hooked end 218 of the latch lever will be rocked upward into position where a cam shaped end thereof will be in the path of the pin 123 on the return stroke of the lever 61. The pin 123, upon engaging the cam shaped end will cause said lever 213 to be rocked until it passes by the hooked end, whereupon the said hooked end will snap back and provide a positive stop in the path of said pin 123 until the lug 202 on the slide bar 199 is released at the end of the machine cycle of operation, in a manner previously referred to. The rocking motion of the lever 213 is permitted by reason of the pin and slot connection 216, 217, and the hooked end 218 is returned to the path of the pin 123 by means of a spring 220 connected to the slide bar 194 and arm 215. After the release of said lug 202 on the slide bar 199, the slide bar 194 will be urged to the right through the effect of the spring 211 to thereby rock the latch lever 213 out of latched engagement with the lug 123.

*Letter feed*

As best shown in Figs. 7, 15, 16 and 18, a letter feed means is provided, which is arranged within the meter casing of the detachable meter unit. Included in said letter feed means are two feed belts 236—236, suspended on forwardly disposed pulleys 237—237 and rearwardly disposed pulleys 238—238. The rear pulleys 238 are fixed to a shaft 239, which shaft has grooved rollers 240 at the opposite ends thereof, said rollers being rotatably supported within pockets 235 in arms 241—241, and also has fixed thereon an impression roller 242.

The said arms 241—241 are pivotally mounted at their forward ends on studs 247, Fig. 15, secured to vertical supporting plates 248 of the meter casing, and support a rod 243 at their rearward ends. Said rod 243 is also mounted, midway between the ends thereof, upon a yieldable support 244, as best shown in Fig. 16, which support is cushioned upon a coil spring 245, suitably anchored on a base plate 246 of the meter casing.

The forward belt supporting pulleys 237—237 are mounted on the forwardly extended arms of two bell crank levers 251—251, which are pivotally mounted upon studs 252—252 projecting inwardly from the vertical plates 248—248. Two downwardly disposed arms 253—253, one on each of said bell crank 251—251, are urged in a forward direction by means of spring pressed connecting rods 250—250, which have one end joined to said arms 253, and have their opposite ends slidably mounted within suitable bearings 254.

Associated with said downwardly disposed arms 253, are means to rock the bell cranks 251—251 to thereby rock the conveyor belts 236 from the letter conveying position of Fig. 16 to the letter receiving position of Fig. 10. Said means comprises two rocking devices which bear against the downwardly disposed arms 253—253 of the bell cranks 251—251, each device including a roller 254 carried by a lever 255, which lever is fixed to a shaft 256, supported in the vertical plates 248—248. Also fixed to said shaft 256 is another lever 257, Fig. 10, which has an upwardly disposed arm 258 projecting into the path of the previously mentioned plunger rod 112, which is controlled by the setting lever 61.

Upon moving the setting lever 61 to the full line position of Fig. 10, the plunger rod 12 will engage the arm 258 and rock the lever 257 in a counter-clockwise direction from the position of Fig. 16 to that of Fig. 10. During this movement, the shaft 256 and levers 255 will be rocked, to thereby cause the rollers 254 to roll over the inclined or cam shaped edges of each of the arms 253 and rock the levers 251 in a clockwise direction. Through the force of the spring urged rods 250, Fig. 16, which, as previously stated, urge the arms 253 forward, the cam shaped edge of said arms 253 will bear against the rollers 254 and thereby move in accordance with any change in the position of said rollers. This structure is in effect an off-center spring actuated device which will retain the conveyor belt mounting in either the receiving position of Fig. 10 or the conveying position of Fig. 16.

The movement of the conveyor belt mounting from a receiving to a conveying position, is effected when the machine is tripped upon inserting a letter in the machine. The tripping operation, which will be later described, will cause the release of the latch lever 125 from its engagement with the head portion 135 of the lever 134, Fig. 10. This in turn will cause the lever 134 to be rocked by the action of the spring 146 to move the upper surface of the said head 135 abruptly against a downwardly projecting end 259 of the lever 257. The lever 257 will thus be rocked and the rollers 254 will roll upward over the cam portion of the arm 253 to permit the return of the parts to the position of Fig. 16.

*Letter trip*

The mechanism for effecting a letter tripping operation comprises a trigger unit which includes two trip fingers 225—225, Figs. 7 and 16, each of which is mounted on opposite ends of a bar 226, which bar forms a part of a T-shaped mounting, as best viewed in Fig. 7. A central rod 227, which forms a part of said T-shaped mounting, is pivotally mounted within a yoke bracket 228, the said bracket 228 also being pivotally mounted within the forked end of a lever 229 which is fixed to a cross shaft 231. Said yoke bracket comprises a structure resembling an inverted cross with a vertically disposed portion arranged to form a swivel for the rod 227 and fingers 225—225 supported thereby, and a horizontally disposed portion arranged to provide a pivot about which the rod 227 may swing on a horizontal axis. This arrangement thus provides for universal movement about a vertical and a horizontal axis. The purpose of this universal structure is to permit the yoke bracket 228 to swivel about the axis of the rod 227, to prevent a tripping operation unless both fingers 225 are squarely engaged by the letter when it is inserted in the machine. This will always ensure the correct feed of a letter as well as the correct placement of a stamp impression on the face of the envelope.

When inserting a letter in the machine, it is placed upon the platform 52 with its face up and with the right hand edge thereof engaging a vertically disposed straight edge or guide member 232, Fig. 1; then it is moved inward until its forward edge reaches the position shown in Fig. 27. During this forward motion of the letter, the fingers 225, yoke bracket 228 and rod 227, will have been moved from the position shown in Fig. 16 to the position of Fig. 27. Further movement of the letter is limited temporarily by the engagement of the fingers 225 with an abutment 233, provided at one edge of an opening within a plate 230, which forms a part of the meter casing. Said fingers 225 will be subsequently moved to the dot and dash line position of Fig. 27 by means to be later described. Also during the initial movement of the letter, the lower end of the rod 227 will engage the blade 123 of the latch lever 125 to release said latch lever from its latched engagement with the lever 134, Fig. 10, and thus cause the mercury switch to be moved to a contact position in the manner previously described, to start the machine cycle of operation. Further, when said latch lever 125 is released, the head 135 of the lever 134 will be thrust upward into engagement with the end 259 of the lever 257 to effect the rocking of the conveyor belts to a conveying position in a manner previously described.

*Machine drive*

In Fig. 27, the tripping operation is best illustrated. Here the letter is shown in its effective tripping position. The conveyor belt 236 will move to the dot and dash line or conveying position at the instant tripping is effected.

Upon tripping the mercury switch to a contact closing position, the motor 168, Fig. 9, will become energized and will start the machine driving cycle of operation. The drive mechanism includes a pulley and belt drive, generally indicated at 262, which drives a worm shaft 261, Figs. 6, 13 and 23. Said worm shaft 261 is mounted in suitable bearings 263 and has a worm 264 secured thereto. Meshing with said worm 264 is a worm wheel 265 which is fixed to a main drive shaft 266. As best shown in Fig. 23, said drive shaft 266 is carried by the walls 141—141 of the support 142, the right end thereof being supported in a bearing 260, formed in the right wall 141, while the left end thereof has its bearing within a sleeve member 260a which sleeve is rotatably mounted in the left wall 141.

Fixed upon said drive shaft 266 and rotatable therewith are two ratchet gears 267 and 268, which ratchet gears provide the drive for two members, which will be hereinafter referred to as the first clutch member, designated generally by the arrow 269, and a second clutch designated generally by the arrow 270. The terms first and second clutch members will also indicate their order of operation. The first clutch 269 controls the operation of coin actuated mechanism of Fig. 6, also the setting of the value printing wheels, Fig. 15, and the setting of the registering mechanism. The second clutch member 270 controls the operation of the meter unit in effecting a printing operation and restoring the printing wheels to their zero positions.

As best shown in Figs. 23 and 28, the first clutch member 269 comprises two freely rotatable supporting discs 271—271 positioned at either side of the ratchet gear 267. Between said discs are mounted pins 280, 280a, shown in Fig. 28 and Fig. 23 respectively. A spring pressed pawl 272 is carried by the pin 280, and a cam plate 273 is pivotally mounted upon the pin 280a. The cam plate has its peripheral edge in engagement with the end of the pawl, to normally hold the pawl out of engagement with the ratchet gear 267 until a machine cycle of operation is effected. To retain the cam plate 273 in the latter normal position, a projection 274a thereon, normally engages a movable stop 274, which stop is fixed to and movable with the same shaft 139, which carries the mercury switch actuating lever 164. Said stop 274 therefore, normally supports the cam plate in a position which will cause the pawl 272 to remain in a non-engaging position with relation to the ratchet in a manner similar to any common form of ratchet clutch. But at the instant the mercury switch 151 is tripped, the said stop 274 is removed from the path of the lug 274a, which causes the cam plate to pivot about the pin 280a by the spring action of the spring pressed pawl 272, to allow the said pawl to engage the ratchet 267 and provide for the drive of said clutch 269. The stop 274 is also adapted to engage a notched portion 274b in one of the discs 271 to directly stop the rotation of the disc members.

A gear 275 is riveted to one of the discs 271, as best shown in Fig. 23, and meshes with a pinion 276, Fig. 9, which pinion is fixed to a shaft 277, as best shown in Fig. 6. The said shaft 277 is positioned parallel to clutch shaft 266 and is supported in bearings provided in the walls 141—141 of the supporting structure 142. Said shaft 277 is adapted to be driven through six revolutions during each machine cycle of operation, while the first clutch member 269 is driven through three revolutions, there being a two to one ratio between the gear 275 and pinion 276.

*Drive timing mechanism*

A timing mechanism is provided to limit the drive of the first clutch member to three revolutions and the second clutch member 270 to one revolution.

Said timing mechanism comprises a disc 278, Figs. 9 and 23, which is fixed to one face of a gear 279, and has a pin 281 projecting outwardly from the exposed face of said disc. The gear 279 is freely rotatable upon the end of the shaft 266 and is limited to a rotation of one revolution while the shaft 266 rotates through three revolutions. This drive is accomplished through the medium of a reducing gear train which includes a pinion 282 meshing with said gear 279, a gear 283 fixed upon shaft 290 which also carries the pinion 282, and pinion 284 meshing with said gear 283, the latter pinion 284 being driven at the same rate of speed as the gear 275, or three revolutions. To provide for the same rotation of the pinion 284 and the gear 275, a hub 284a on said pinion is preferably secured within the gear 275 by means of a splined or press fit.

Associated with said timing disc 278 is a lever 285, which is fixed to the outer end of shaft 139 on which the clutch stop bar 274, Fig. 28, is mounted. When the mercury switch 151 is tripped to a contact position by the action of the lever 164, Fig. 22, and the stop bar 274 is rocked out of its normal stop position to release the first clutch member, the lever 285 will be rocked in a clockwise direction, as viewed from Fig. 9, to move a toe portion 286 at the lower end of said lever 285 into the path of travel of the pin 281 on the disc 278. Upon the completion of a full revolution of the disc 278, the pin 281 will have engaged the toe portion 286 which will cause the lever 285 to be rocked in a counter-clockwise direction as viewed from Fig. 9, and will consequently rock the shaft 139 and the stop bar 274 back to its normal stop position in time to stop the first clutch member at the end of its third revolution. The said lever 285 is retained in either of its two positions by means of a toggle connection shown in Fig. 9, which comprises a lever 287, having one end pivotally mounted upon a fixed stud 288, and having its opposite end connected with one end of a short link 289, said link having its other end connected with the lever 285. Through the action of a spring 291, secured to the lever 287, said link 289 is snapped to the right or the left of its vertical center upon movement of the lever 285 to the right or to the left.

After the first clutch member 269 has completed its cycle or three revolutions of movement, the second clutch member 270 will start its cycle of one revolution of movement. This cycle of the second clutch member is effected, as best shown in Fig. 9, in the following manner. By means of the engagement of the pin 281, on the disc 278, with a beveled nose portion 292 of a lever 293, a shaft 294 is rocked. Said shaft 294 is supported between the side plates 141—141 of support 142, as best shown in Fig. 23, and has a stop lever 295 mounted thereon, which stop lever, as shown in Fig. 22, is adapted to engage a projection 295a on a cam plate 273a to normally hold a pawl 272a out of engagement with its associated ratchet gear 268. Said stop lever also engages a notched portion 295b in one of the discs 271a. Since the second clutch member 270 is of the same type and structure as that of the first clutch member 269, a detailed description thereof will not be made.

Referring to Fig. 9, it will be seen that upon engagement of the pin 281 with the nose 292 of the lever 293, the said lever 293 will be rocked in a clockwise direction, to thereby rock the shaft 294 and release the stop lever 295, Fig. 22, from its engagement with the projection 295a on the cam plate 273a. The pawl 272a will thus be adapted to engage the ratchet gear 268, to effect the drive of the second clutch member through its cycle of movement in the same manner as that described for the first clutch member 269.

As shown in Figs. 22 and 23, another lever 296 is also secured to the shaft 294, which has an inwardly diverted nose portion 297. Upon rocking said shaft 294, the nose portion 297 of the lever 296 is moved into the path of a pin 298, which pin projects sideward from one of the discs 271a of the second clutch member. Said pin 298 is adapted to engage the nose portion 297 before the full revolution of the second clutch member is completed, to thereby rock the lever 296, the shaft 294 and the lever 295 in a counter-clockwise direction, and cause the end of said stop lever 295 to be moved into the path of the projection 295a of the cam plate 273a. Upon said engagement, the pawl 272a will be cammed to its non-driving relation with the ratchet 268 or the position shown in Fig. 22.

After the second clutch member 270 has completed its revolution of movement, the entire machine cycle of operation is completed, and being completed, it is desirable to discontinue the operation of the motor drive. Referring to Fig. 22, a lug 301 is formed on a flange portion 300 of the sleeve member 260a, Fig. 23, which lug is adapted to strike the arm 162 of the switch bracket 152. Said arm 162 would normally be lying in the path of the said lug 301 when the switch is in a tripped or contacting position. Upon engaging said arm 162, the switch bracket 152 will be returned to the open contact position of Fig. 22.

*Printing unit*

As previously stated, the first clutch member 269 controls the setting of the printing type wheels in accordance with the value of each coin inserted in the machine. Before describing the structure which is controlled by the coins and the setting of the type wheels, the structure of the printing mechanism within the meter unit, which includes the type wheels, will first be described.

As best shown in Figs. 16 and 18, said structure includes a printing drum or cylinder 302, having flanged heads 299—299 which are rotatably mounted upon trunnions 303 and 304 projecting from supporting bosses 305 and 306 respectively, which bosses project from the vertical support plates 248—248 of the meter unit casing.

Upon the surface of the drum cylinder 302 is an indicia printing die 307, Fig. 16, for the printing of the postal station and other indicia. Within the indicia die portion are two type wheels, Fig. 15, a units type wheel 308 and a tens type wheel 309. The units type wheel 308 is freely mounted upon a shaft 310, which shaft is rotatably mounted in bearings, one provided at 311 and one provided at 311a in one flanged head 299 of the printing drum. The tens printing wheel 309 is fixed to said shaft 310.

The units printing wheel 308 has a pinion 312 secured thereto as best shown in Fig. 15, which pinion is adapted to be driven by means of a drive gear 313. A pinion 426 is also fixed to the shaft 310 which carries the printing wheel 309 and is adapted to be driven by a gear 427 as will be hereinafter more fully described. As best shown in Fig. 18, said drive gear 313 is pinned to a shaft 314, which shaft is rotatably mounted in bearings 315 and 316, provided in the left hand head 299 of the printing drum 302 and the right hand outer wall of the meter unit casing respectively. Also fixed to said shaft 314 is another gear 317, which is adapted to be driven through the means of a drive pinion 318, said pinion being slidable endwise upon a splined shaft 319. Said splined shaft is fixed within a coupling 321, which coupling is rotatably mounted within a bearing 322 provided on the right side wall of the meter casing as viewed from Fig. 18, and has a key slot 323 provided within the outer face thereof. The opposite end of said splined shaft 319 is rotatably mounted in a suitable bearing 324, provided on one of the vertical support plates 248.

When the meter unit is placed in an operating position within the machine, the coupling member 321 is coupled with a coin actuated drive means in a manner which will be later described, and upon rotation of the splined shaft 319, the drive pinion 318 will be rotated, which in turn will drive the gear 317, shaft 314, units type wheel drive gear 313, printing wheel pinion 312, Fig. 15, and the units printing wheel 308.

When the units printing wheel 308 has rotated through one revolution, a transfer will be made from the units wheel to the tens wheel by means of a Geneva drive which is generally indicated at 325 in Fig. 16.

*Setting of type wheels*

The means for setting the value in said type wheels 308 and 309 in accordance with the value of the coins, which were inserted in the machine, will now be described.

In the earlier part of the specification, it was shown how the coins 50 were transferred from their visible positions in front of the visible display unit 57, or the full line position shown in Fig. 12, to their operating position, or dot and dash line position of Fig. 12, at the time the setting lever 61 was pulled to the forward or full line position of Fig. 10. Here the coins were released and were permitted to drop through each of the three individual coin guides 82, through which they were guided into three vertically disposed passages 326, which passages are arranged one directly behind the other. Finally the coins will have come to rest in the position best shown in Fig. 6. While in this position, it will be seen that the lowermost coins will be resting upon the upper curved portions of the coin actuating members or levers 83.

The coin actuating members 83 are mounted in a group, as best shown in Fig. 25, the same being secured to a sleeve 327, which sleeve is pinned to a shaft 328. Said shaft 328 is pivotally mounted in bearings provided in ears 329 projecting sidewardly from a part of the wall 141, indicated at 331 Figs. 6 and 24, which structure is suitably supported on a part of the main supporting bracket 142. A lever 332 is fixed to the forward end of the shaft 328, as viewed from Fig. 6, which lever has its outer end connected with a cam controlled lever 333 by means of a yieldable connecting link generally designated at 334, Figs. 6 and 9. The lever 333 is pivotally mounted at 340 upon a suitable support 339, and has a roller 341 rotatably mounted thereon and positioned about mid-way between the ends thereof.

The yieldable connecting link comprises two clevis members 335, 336 which are connected to the lever 332 and 333 respectively and which are linked together by means of a sleeve 337. The upper clevis member 335 is fixed to said sleeve, while the lower clevis member 336 is adapted to be moved endwise therein. A spring 338 is included within the sleeve 337 and is compressed between the ends of each of said clevis members 335 and 336 to complete the yieldability of said link structure.

A cam member 342, having a cam groove 343 therein, is fixed to the shaft 277, which shaft is driven through the gear train 275, 276, Fig. 9, as previously referred to, during the operation of the first clutch unit 269, shown in Fig. 23. The cam roller 341, on said lever 333, engages the cam groove 343, and on rotation of the cam member 342 will, upon following the curvature of the groove 343, rock the lever 333 about its pivot 340 and cause the lever 332 to be rocked. The rocking of the lever 332 will in turn cause the rocking action of the coin actuating members 83 and move same from the position of Fig. 6 to the position of Fig. 24. While moving to said latter position, stripper heads 344, which are formed on each of said coin actuating members 83, will engage the coins which are in the path thereof and strip said coins from each stack as shown in Fig. 24, then will finally eject same into the coin discharge chutes 331.

Three bell cranks 345 are pivotally mounted on a pin 346, supported in fixed ears 349, as shown in Figs. 6 and 24, there being one bell crank member associated with each row of coins. On one arm 347 of each of said bell cranks is a roller 348, which is normally positioned in the path of the lowermost coins, and is arranged in such manner that, when any of the coin actuating members 83 are moved from the position of Fig. 6 to that of Fig. 24, the peripheral edge of the coin will, on moving past the roller 348, rock an associated bell crank lever 345 from the dot and dash line position of Fig. 24 to the full line position.

Mounted on the shaft 277, Fig. 6, are three mutilated gears 351, 352 and 353, which gears are provided with one tooth, five teeth and ten teeth respectively, to correspond with the denominations of the coins which are adapted to be inserted within this machine, namely the one cent, five cent and ten cent coins. Above said mutilated gears, three pinions, 351a, 352a and 353a are slidably mounted upon a spline shaft 354, which shaft is rotatably mounted in suitable bearings 355—355, provided in one wall 141 and an intermediate wall 141a, which form a part of the supporting bracket structure 142. Each of said pinions 351a, 352a and 353a is provided with a hub portion and each hub has a peripheral groove as designated at 351b, 352b and 353b.

Three levers 356 are pivotally mounted on studs 357, which studs are secured within a bracket 358 supported between the walls 141 and 141a. Rollers 359 which are rotatably mounted upon the lower ends of the levers 356, engage the grooved portions 351b, 352b and 353b of the hubs of said pinions 351a, 352a and 353a respectively.

Springs 369, which are stretched between arms 361 of said bell cranks 345 and an anchor pin 370, are provided to normally urge the bell cranks 345 to a position which will retain the rollers 348 on said bell cranks in the paths of their respective coins, as best shown in Fig. 6.

The shaft 277, as previously stated, will be rotated through six revolutions by means of the gearing 276 and 275, Fig. 9. The cam member 342 will therefore be rotated through six revolutions which will thus cause the coin actuating members 83 to rock six times and thereby strip up to six coins from each row of coins deposited or stacked in the passage 326.

As each coin is stripped and moved past the rollers 348, the corresponding bell cranks 345 are rocked and, by means of connecting links 362 between said bell cranks 345 and levers 356, consequently cause the rocking action of associated levers 356 and pinions 351a, 352a or 353a sideward into alignment with their associated gears 351, 352 or 353.

Assuming that one coin of each of the three denominational values namely the one cent, five cent, and ten cent coins were lying within the channel 326, the rocking action of the coin actuated members 83 would then cause each of said three coins to be moved past the rollers 348 to a final ejecting position, and during said movement would cause each of the three bell cranks 345 to be rocked, which in turn would move the pinions 351a, 352a, and 353a into their operating positions with relation to the mutilated gears 351, 352, and 353. As is the usual practice in a mutilated gear drive of this type, the teeth on each of said mutilated gears are arranged in a staggered relation to thus permit each of said gears to drive their respective pinions without interference and finally cause the spline shaft 354 to be rotated in accordance with the total value of the coins inserted.

The drive of said spline shaft 354 is finally transmitted to the type wheel 308 through the direct driving connection provided by means of a hub 363 on a choke disc 364, to be later described, and pinned to the splined shaft, said hub having a key 365, which is adapted to engage the slot 323 of the previously described coupling member 321 of the meter unit shown in Fig. 18. The rotation of said spline shaft 354 will thus be transmitted, through the coupling 321 to the pinion 318, gear 317, shaft 314 and gear 313, then through the pinion 312, and type wheel 308, of Fig. 15.

To hold the pinions 351a, 352a, and 353a, Fig. 6, in either their actuating or non-actuating positions, a rocker member 366 is provided which comprises two end plates 378—378, fixed to shaft 328 and having a tie rod 379 and a detent rod 367 supported between them. The detent rod has its upper surface shaped to fit one of two toothed spaces 368—368 in the lower end of the bell crank 345, which tooth spaces will be engaged when the rocker member 366 is rocked upward through the action of the cam 342 and lever 333 during each revolution of the cam. While said detents 367 are engaged with either of the tooth spaces 368, the pinions 351a, 352a, and 353a will be held fast against any sideward movement.

It is to be noted that since the link 334 is yieldable, it will act in the capacity of a safety link. For example, if any of the coins should become jammed, to thereby prevent the coin actuated member 83 from moving through a full operating stroke, the spring 338 of the yieldable link will compress and thus prevent any damage to any of the mechanism.

To prevent any overthrow of the counter wheel drive, after the last tooth of any one of the mutilated gears 351, 352 or 353 passes beyond the pinions 351b, 352b and 353b, a choke means is provided, which will stop the rotation of the spline shaft 354 momentarily. As best shown in Figs. 3 and 6, said choke means comprises the previously mentioned choke disc 364, which has teeth 371 on the periphery thereof and is fixed to the outer end of the spline shaft 354. Associated with said choke disc is a choke cam 372 which is fixed to the outer end of the shaft 277, and a bell crank 373 which is pivotally mounted at 374 on one wall 141 of the support 142.

One arm of said bell crank has a roller 375 thereon which is adapted to become engaged between the teeth of the choke disk 371. Another arm of the bell crank has a hook shaped portion 376 at the end thereof which is adapted to normally remain in engagement with the peripheral surface of the choke cam 372. The periphery of the choke cam 372 is provided with three low surfaces, as indicated at C, F and T and three high surfaces as indicated at C', F' and T'. While the hook portion 376 of the bell crank 373 is in engagement with one of the high surfaces, such as indicated in Fig. 3, the roller 375 is seated within one of the toothed spaces of the choke disc 364 to thereby lock said disc and splined shaft 354 against rotation. When the said hook portion 376 rocks to one of the low surfaces of the cam 372, the roller 375 is free of the tooth space to permit the rotation of the said choke disc and splined shaft. During the initial rotation of the shaft 277, when the coins are being stripped, the hook portion 376 will ride the high point of the choke cam and the choke disc 364 will remain in a locked position, but upon engagement of the hook portion 376 with the notch C, the wheel 371 will be freed momentarily to permit the one toothed mutilated gear 351, which represents the one cent coin, to engage and move the pinion 351b the distance of one tooth. By the time the one tooth has set up its value in the units printing wheel 308, the hook 376 will have again reached the high surface of the choke cam at C' momentarily to again lock the wheel 371. Said hook will next move into the notched portion indicated at F to permit the mutilated gear 352, which represents the five cent coin, to permit the meshing of its five teeth with the pinion 352a. After the five teeth are set up in the units printing wheel, the hook portion 376 will be cammed out to the surface F' of the choke cam momentarily, then will move to the low point of the cam again or the notch indicated at T, to permit the operation of the ten toothed mutilated gear 353 with its pinion 353a, which will set up ten units in the units printing wheel. At the end of said operation, the hook portion will be returned to the high point or the position indicated at T', as in Fig. 3. It will thus be seen that during each revolution of the shaft 277, the values of any three coins of different denomination may be set up in the type wheels and after the setting of each value the rotation of the pinion shaft 354 will stop.

After the shaft 277 has rottated through six revolutions all of the coins will have actuated their respective mechanisms and will have had their accumulated values set up in the type wheels ready for the printing operation. The coins also will have passed through the final discharge chute 331 into any suitable receiving receptacle such as indicated at 377 of Fig. 6.

Also, when the said shaft 27 has rotated through six revolutions, the timer disc 278 of Fig. 9 will have completed one full revolution and the pin 281 thereon will have rocked the lever 285 and rock shaft 139, thereby resetting the clutch stop bar 274, Figs. 23 and 28, to stop the first clutch member 269 from further movement in the manner previously described.

Also, upon the completion of the movement of the first clutch member 269, the second clutch member 270 will be moved to an operating position through the engagement of the pin 281, Fig. 9, with the nose 292 of the lever 293 which will rock the shaft 294 and release the stop bar 295, Fig. 22, in the manner previously described.

*Printing cycle*

Through the direct drive connection of a keyed end 381, Fig. 23, of a plug 382, projecting from and pinned to the sleeve 260a, with the slotted end 383 of a sleeve 384 fixed on a shaft 385, Fig. 19, a direct drive is provided from the clutch driven sleeve 260a to said shaft 385. Said shaft 385 is rotatably supported in bearings 386—386 and has a mutilated gear 387 fixed thereto, which gear is adapted to mesh with another gear 388, Figs. 17 and 18, which is secured to one end or head portion of the printing drum 302.

When the gears 387 and 388 are in the position shown in Fig. 17, which position agrees with the home position of the printing drum, the mutilated portion of said gear 387 is adjacent the teeth of the gear 388. Therefore, when the mutilated gear 387 begins to rotate, there will be a slight dwell period before the teeth of said gear 387 will pick up the teeth of the gear 388. Also, before the mutilated gear 387 has completed its full revolution, the teeth thereof will move out of mesh with the teeth of said gear 388 to cause another dwell period during the latter part of the revolution. After the last tooth of the gear 387 leaves the gear 388, the printing drum will have completed one revolution. To prevent the drum from being rotated beyond one revolution, a plate 389, having a convex outer edge and fixed to one face of the gear 387, engages with a concave edge on a companion plate 391 fixed to one face of the gear 388. Through said engagement, the printing drum will remain in a fixed position until the teeth of the gear 388 are again engaged by the teeth of the gear 387 during the next cycle of machine operation.

The purpose of the dwell period is to permit certain operations to be performed before the printing cycle of operation is started. One of said operations is the provision of means for sliding the drive pinion 318, Fig. 18, endwise along its spline shaft 319 to thereby remove said pinion from meshed driving relation with the gear 317, which controls the setting of the unit type wheel. If the drum were permitted to be rotated without disconnecting said gear 318 from its driving relation with the gear 317, the device would become jammed.

The means provided for shifting said gear 318 comprises a swivel lever 392, best shown in Figs. 14 and 20, which is adapted to swivel about a vertical axis provided by the forked bearing 393. Said lever has one lug 394 projecting upwardly and positioned in an annular groove 395 provided in the hub portion of the gear 318. Another lug 396, projecting downwardly from the opposite end of said lever 392 projects within a cam slot 397 of a cam 398 fixed to the shaft 385, as best shown in Figs. 14 and 19. The cam slot 397 is so arranged, that upon the initial movement of the shaft 385 and cam 398, the swivel lever 392 will be pivoted about its axis to thus cause the gear 318 to be shifted out of mesh with the gear 317 and into mesh with an aligner plate 320, best shown in Fig. 20. After the revolution of the printing drum is completed, the gear 318 will be moved into mesh with the gear 317.

Another operation to be performed during the dwell period is to rock the supporting lever 229, Figs. 16 and 20, which carries the trip finger yoke bracket 228, to thus remove the trip fingers 225 from the path of the letter before the letter is conveyed to a printing position. As best shown in Fig. 20, the means provided for this purpose, comprises a lever 401, fixed to the shaft 231, which carries the trip finger supporting lever 229, and is linked to one arm of another lever 402 by means of a link 403. Said lever 402 is pivotally mounted between its ends upon a stud 404, and has a roller 405 rotatably mounted on the opposite end thereof. Said roller 405 is maintained in engagement with the peripheral surface or edge of a cam 406, which cam is secured to the face of the aforementioned cam member 398, as best shown in Fig. 19. From the position of the roller 405, with regard to the cam surface of the cam 406 as shown in Fig. 20, it will be seen that upon the initial movement of the shaft 385, the lever 402 will be rocked in a counterclockwise direction to thereby rock the lever 401 and shaft 231 in a clockwise direction. This movement will cause lever 229 and the trip finger yoke bracket to be rocked downward to remove the trip finger from the path of the letter.

After the completion of the above operations during the first part of said dwell period, the teeth of the mutilated gear 387 will engage the gear 388 of the printing drum and rotate said drum through one complete revolution.

Referring to Fig. 16, it will be noted that the printing die 307 and the printing wheels 308 and 309 are positioned approximately 90 degrees back of the printing position. It is so placed to permit the printing die to be inked and to also permit the letter to be conveyed to a printing position before the printing die has approached the letter. The inking mechanism may be of any conventional type. The type disclosed comprises an ink roll 411 rotatably mounted upon a shaft 412 supported within a suitable bracket 413.

Letter feed

The conveyor belts 236—236 are driven by means of the pulleys 238—238 which, as previously stated, are fixed to the impression roller shaft 239, said shaft 239 being driven in a manner to be later described. Cooperating with the conveyor belts 236—236 to feed letters to a printing position, is a pair of driven feed rollers 527—528 as best shown in Fig. 7, which rollers are mounted directly over the leading ends of the belts in the position best shown in Fig. 15.

The feed roll 527 has secured thereto a pinion 529 and both are rotatably mounted as a unit upon a stud 531 fixed to one wall of the meter unit casing. Said pinion 529 is driven by means of a gear 532 which is secured to the one end of the printing drum 302, as best shown in Figs. 17 and 18, and will be rotated when the printing drum is rotated. An intermediate pinion 533 mounted on a shaft 530, meshes with the gear 532 and pinion 529 to provide for the proper rotation of the feed roller 527. The shaft 530 extends the length of the meter casing and has its ends supported in the side walls thereof.

The feed roller 528 is fixed to a shaft 534, supported in an outer wall and intermediate wall of the meter unit casing, as best shown in Figs. 7 and 15, said shaft also having a pinion 535 fixed thereto. Said pinion 535 is driven by means of a drive pinion 536 fixed on the end of the shaft 530, as shown in Fig. 15, which shaft as stated above is driven by means of the pinion 533 and gear 532.

It will thus be seen that when the feed belts move to a conveying position, the letter will be gripped between the belts 236 and the feed rollers 527, 528 and since both the belts 236 and the feed rollers 527, 528 are driven, the letter will be conveyed to the printing drum. The letter will therefore start moving toward the printing drum as soon as the drum starts to rotate and upon reaching the printing position, said letter will be engaged by the printing die of the printing drum to receive a value stamp impression in the upper right corner, the said impression having a value agreeing with the total value of the coins deposited in the coin receiving compartment 55.

The impression roller shaft 239 is also driven and receives its drive from the pinion 536 as best shown in Fig. 15, there being an intermediate pinion 538 which meshes with said pinion 536 and with another pinion 539. The latter pinion 539 is carried by a stud 541 secured in the meter unit casing, and is joined to the impression roller shaft 239, as shown in Fig. 18, by means of a universal shaft 542. The universal shaft connection will allow transverse movement of the impression roller for mail of varying thickness.

It will thus be noted that no further operation on the part of the operator is required, after the coins are inserted and the handle 61 is manipulated, other than to insert the letter into the letter slot which is normally covered by the shutter member 171. Upon tripping the machine, the letter will remain at rest momentarily until the printing drum begins its rotation, whereupon the conveyor belts 236 are moved and the letter is automatically drawn into the machine. After the printing operation, the movement of the letter is continued, through contact of the peripheral edges 414—414 of the printing drum flanges with the upper surface of said letter, until said letter completely passes between the printing drum and impression roller. From this position said letter will pass through a chute 416, Fig. 16, into the letter receptacle 53, Fig. 1.

Printing wheel lock

To prevent movement of the printing wheels while passing through a printing cycle of operation, a locking member 417, Fig. 16, is provided which is pivotally mounted within the printing drum on a stud or shaft 418 and has a roller 419 rotatably mounted thereon which engages a cam groove 421 of a cam 422 fixed to one wall 248 of the meter casing, as best shown in Fig. 18. The roller 419 is mounted on a stud 423 which projects outward through a slot 424 in one end wall or flange 299 of the printing drum 302. Upon rotation of the printing drum, the roller 419 will follow a rise in the cam groove 421 to thereby rock the locking member 417 and cause a detent 425 formed thereon to engage between the teeth of the pinion 312, which is associated with the units printing type wheel 308, also pinion 426, which is associated with the tens printing type wheel 309, which gears are best shown in Fig. 15. Before the printing drum reaches its home position the detent 425 is again withdrawn.

Restoring type wheels

After the printing operation has been completed and the detent 425 is removed from its engagement with the gears 312 and 426, which operations are performed within the first part of the rotation of the printing drum, provision is made to restore the type wheels 308 and 309 to their zero position. Said restoring operation takes place during the second half revolution of the printing drum.

Adjacent units wheel drive gear 313, as best shown in Figs. 15 and 18, is a gear 427 which meshes with the pinion 426, previously mentioned as associated with the tens printing wheel 309. Each of the two gears 313 and 427 have associated therewith two disc members 428 and 429, each of which disc members have two diametrically opposed teeth indicated at 431—431, as best shown in Fig. 20. The gear 427 is directly joined with the toothed disc member 428 by means of a sleeve 432, Fig. 18. Said sleeve is rotatably mounted within a bearing provided within the trunnion 304, which supports one end of the printing drum 302, and has end flange members 430—430a fixed thereon which are secured to the gear 427 and disc 428 respectively. Any rotation therefore, of the gear 427 will also cause the rotation of the toothed disc member 428. The toothed disc member 429, which is associated with the units gear 313, is directly fixed to the driven gear 317, and the gear 317 is fixed to the shaft 314 upon which said units gear 313 is also fixed. Therefore, any movement of the units gear 313 will also cause the rotation of the toothed disc member 429.

Assuming now for example that a value of 23¢ had been set up in the printing wheels, the units wheel will have actually rotated through a distance of 23 teeth or two and three-tenths revolutions to finally set up the unit 3 in the units printing wheel, while the tens gear will have advanced the distance of two teeth to set up the figure 2 in the tens printing wheel. Simultaneously with the setting of the printing wheels, units gear 313 and tens gear 427 will move, and the toothed disc members 428 and 429 will also be moved therewith. Thus the teeth 431 which are a part of the units disc 429 will have advanced the distance of 3 toothed spaces while the teeth 431 which are a part of the tens disc member 428 will have advanced the distance of two tooth spaces.

It will be recalled that during the rotation of the printing drum through a printing operation or during the period when printing is effected, the printing wheels are in a locked position. The units gear 313 and tens gear 427 will thus also remain in a locked position during this period. After passing through the printing position however, the printing wheels 308 and 309, and gears 313 and 427, also the toothed disc members 428 and 429, will again be free to rotate.

To provide for the restoring of the printing wheels to their zero positions, a stop is moved into the path of the teeth 431 of the toothed disc members 428 and 429 at the start of the second half revolution of the printing drum. Said stop member, best shown in Fig. 20, comprises a lever 434 which is pivotally mounted upon the stud 404, and has a roller 435 rotatably mounted on one end thereof, which roller is maintained in engagement with the peripheral surface of a cam 436 which rotates with the shaft 385. At the opposite end of said stop lever 434 a lip 437 is turned inward, and along the upper edge of said lever an upwardly disposed arm 438 is provided. At the start of the second half of the revolution of the printing drum, the roller 435 will be rocked outward upon engaging the high point 436a of the cam 436, to thereby rotate the stop lever 434 in a counter-clockwise direction and move the lip 437 directly into the path of the teeth 431—431 of the toothed disc members 428 and 429.

It may be here stated that the gears 317, 427 and 313 each have twenty teeth. Therefore, the diametrically opposed teeth 431 on each of the toothed disc members 428 and 429 will be spaced apart the equivalent of ten teeth, and since the locking detent is only removed after the printing drum has passed through one-half of its revolution, there is only one-half or 180 degrees of the peripheral surface of the toothed discs 428 and 429 remaining to effect a restoring operation. After the lip 437 reaches the stop position, one tooth on each of the discs 428, 429, will continue to advance with the drum during the second half revolution of the drum until they engage the lip 437.

In the example set up for the printing of the value 23, the tooth 431 on the units disc member 429 which is in the No. 3 digit position will be seven spaces away from the lip 437 at the beginning of the last half revolution and will be the first tooth to engage the lip 437. Directly thereafter the tooth 431 on the tens disc member 428, which is in the No. 2 digit position and eight spaces away from the lip 437, will engage said lip 437. Upon engagement of the teeth 431 with the lip 437, each of said toothed disc members 428 and 429 will come to rest. This will also cause the gears 313, 427 to come to rest. Although the movement of the disc members is discontinued, the printing drum 302 will continue its movement to complete its full revolution. This will thus cause the type wheel pinions 312 and 426, Fig. 15, which are carried by the printing drum, to be rotated while said pinions are moved around their stationary companion gears 313 and 427 in a planetary gear fashion.

The motion given said type wheel pinions 312 and 426, will thus be sufficient to rotate the units wheel backward three spaces or to move same from the three to the zero position and to rotate the tens wheel back two spaces from the two position to the zero position. At the end of the full revolution of the printing drum the stop lever 434 will have been rocked in a clockwise direction through the movement of the roller 435 off the high point to the low position on the cam 436, which movement will thus rock the lip 437 downward out of the path of the teeth 431. While a spring 439 is provided to maintain the roller 435 in engagement with the cam 436, a pin 441 is also provided on the face of the cam 436, which pin is adapted to engage the arm 438 as shown in Fig. 20 at the completion of the revolution of said printing drum to thereby positively rock the stop lever 434 to its normal position.

Since the unit which includes the disc members 428 and 429 is mounted so as to rotate independently of the printing drum 302, means is provided to drive said unit after a printing operation is effected to thereby positively move the teeth 431 on the discs 428—429 into engagement with the lip 437 of the lever 434. Said drive means comprises two pawls 442—442, which are pivotally mounted on the stud 418 within the printing drum 302. Each pawl 442 has a nose portion 443 thereon which is adapted to be maintained in the path of one of each of two stop teeth 444 provided on two discs 445 and 446, by means of springs 47. Said discs are fixed to the units gear 313 and tens gear 427 respectively as best shown in Fig. 18.

When the type wheel locking detent 425 is released from its locking engagement with the pinions 312 and 426, the pawls 442—442 will continue moving with the drum 302, while the unit, which includes the disc members 428—429 and the discs 445—446, will rotate partially under its own momentum. If the teeth 431—431 of the discs 428—429 do not reach the position of the lip 437, during the momentum of the above mentioned unit, the said pawls 442—442 will eventually engage the teeth 444 of the discs 445—446 and thereby finally drive the said unit to its home position, the position indicated in Fig. 20. When in said latter position the type wheels will be in their zero position.

Register

In addition to housing the printing devices, the meter unit also has contained therein registering mechanism which includes a total register 450 and a subtracting register 451 best shown in Figs. 14, 16 and 20. Said registers are preferably of the units drive and Geneva transfer type supported within a suitable frame 452 and are rigidly mounted upon a bracket 453.

One register drive gear 454 is directly connected with the units wheel of the total register and another drive gear 455 is directly connected with the units wheel of the subtracting register and said gears are arranged in driving meshed relation. A register drive gear 456 and an intermediate gear 457, which are suitably joined together, are freely rotatable upon a stud 458, which stud is fixed in a lug 459 projecting from one wall of the meter casing.

The intermediate gear 457 meshes with the type wheel drive pinion 318 and has a wide tooth surface to permit said pinion to remain in mesh therewith when it is moved out of mesh with the type wheel drive gear 317 preceding the printing operation.

During the period of setting the type wheels therefore, the same value which is set up in the type wheels will be simultaneously set up in the register wheels.

After each printing cycle of operation is complete, the intermediate gear 457 is locked, which operation thus locks both the printing wheels and registering wheels.

Upon pre-setting the machine by means of the manual operation of the lever 61 however, the locking means is released and the printing and register wheels are free to operate.

Said locking means, best shown in Fig. 20, comprises a detent lever 461, having a detent 462, and is pivotally mounted upon a stud 463 supported by a bracket on one wall of the meter unit casing. A rod 464 has one end fixed to said detent lever 461 and is normally urged in a downward direction under the compression of a spring 465, which spring is compressed between an anchor pin 466 and a shoulder provided by a ring 467, fixed to the lower end of said rod. The latter ring portion also extends into an opening 468 in the bottom of the meter unit casing. In the position shown in Fig. 20 the detent lever is shown in its locked position.

In addition to locking the intermediate gear 457, a plunger rod 469 is also secured to the said detent lever, which rod projects downwardly over the path of the aforementioned cam member 406 and has a detent 471 at its lower end, which is adapted to engage a slot 472 in the edge of the cam when the printing cycle of operation is completed. By means of said latter locking means the drive shaft 385 is locked, thus making it impossible to rotate the printing drum.

As best shown in Fig. 10, a pin 474 is slidably mounted within a bearing 475 in the bed plate 97 of the machine and is arranged for vertical movement therein. The upper end of said pin is aligned with the opening 468 in the meter unit casing and the lower end is attached to the free end of a lever 476 carried by the rock shaft 95. When the setting lever 61 is pulled forward, as indicated in full lines in Fig. 10, the lever 476 will rock upward to thereby move the pin 474 upward into engagement with the lower end of the detent lever rod 464. The lifting of the rod 464 in this manner will thus free the detents 462 and 471 from engagement with the gear 457 and cam slot 472 respectively.

To prevent the return of the detents 462 and 471 to their locking positions after a letter tripping operation is effected, a latch means is provided which is adapted to engage a downwardly disposed arm 477 on the detent lever 461. Said latch means comprises an inverted L shaped lever 478 which is pivotally mounted upon a support rod 479 supported by the intermediate and one outer wall of the meter unit casing. A sidewardly disposed arm 481 of said lever 478 is normally urged against the lower end of the arm 477 of the detent lever 461 by the action of a spring 482 and has a notch 483 at the outer end thereof. Therefore when the detent lever 461 is rocked upward, the notched end 483 of the arm 481 will snap in back of the lower end of the arm 477 to prevent said detent lever from returning to a locking position before the type wheel and register wheel settings have been completed. The latch lever 478 is released at the completion of the rotation of the printing drum by means of a pin on the cam plate 406, which is adapted to strike the lower end of the downwardly projecting arm 485, to thus rock the notched end of the latch lever free from latched engagement with the arm 477.

Register lockout

It is customary when using a detachable meter with a mailing machine to have the register wheels of the subtracting register set at the postoffice by an authorized postal official, to the total value of stamp impressions it is desired to make and also to provide for the locking out of the machine against further operation when a predetermined low value has been reached in the subtracting register.

With regard to the locking out of the machine, a structure, best shown in Fig. 21, is provided which comprises a locking lever 488, pivotally mounted intermediate its ends at 489 upon a support arm 491 on the register frame 452. At one end of said locking lever is a locking comb 492, which is normally adapted to be urged against the peripheral surfaces of one or more projecting hub portions 493, or the like, of one or more of the register wheels. Also within the said hub portions, upon which the locking combs rest, are slots 494, into which the comb portions will drop when the slots are aligned therewith, which occurs at the certain predetermined low value mentioned above.

The means for urging said locking comb 492 against the hub portions, comprises a lever 495 fixed to a shaft 496 and having a free rocking connection with the other end of the locking lever 488. Also fixed to said shaft 496 is another lever 497 having one end of a link 498 secured at the free end thereof, which link is urged sideward and downward by means of a spring 499. The force of said spring is arranged so as to tend to rock the shaft 496 in a clockwise direction, as viewed from Fig. 21, to thereby urge the locking lever 488 in a counterclockwise direction about its pivot 489, to urge the locking comb 492 inward against the hub surfaces.

A vertically disposed plunger rod 501, is slidably mounted within an opening 500 in a block 502, supported within the upper wall of the meter unit casing, and is joined with the link 498 by means of another link 503. Along the lower surface of the link 498 is a cam shaped blade 504, which is adapted to move into the path of a pin 505, projecting from the face of cam member 398, when the locking lever 488 is rocked during the period that a register lock-out is effected. When said latter operation is effected and the pin 505 strikes the cam blade 504, the link 498 will be rocked upward to thereby force the plunger rod upward through the block 502.

Cooperating with the plunger rod 501 is a device for setting certain locks to prevent the inserting of coins into the machine after the registering mechanism is locked out. Said device includes a shaft 506, best shown in Figs. 2, 6, 9, and 21, which shaft is supported in bearings provided in an upwardly disposed wing 507 on one wall 141 of the support 142, and in a strap 508 supported by uprights 509 on the other wall 141 of said support 142. A lever 511, Fig. 21, fixed to said shaft 506, has a pin 512 projecting downward from its free end, which pin is adapted to project into the opening 500 in the block 502 when the meter unit is positioned in place in the machine, to function as a meter locating pin.

Also secured to said shaft 506 is a handle 513 which is adapted to be swung downward to the position of Fig. 2 directly in front of the meter unit casing to lock said meter unit in an operating position.

The cam member 77 previously referred to, and best shown in Figs. 8 and 9, is also fixed to the shaft 506, which cam member is adapted to rock the aforesaid rocker plate 67 to remove the shelf portion 66 from the path of the coins, to permit the return of said coins when the register mechanism of the meter unit is locked out.

When the register reaches a lock-out position and the cam blade 504 on the link 498 is struck by the pin 505 at the end of a machine cycle of operation, the plunger rod 501 will be driven upward to thereby strike the pin 512 and rock the lever 511 and consequently said shaft 506. The rocking of said shaft 506 will remove the handle 513 from engagement with the meter unit casing and will rock the cam lever 77, to cause the cam portion to swing the arm 68a upward and thereby rock the rocker plate 67 about the pivot 70. This, as stated above, will remove the shelf 66 from the coin path and thereby permit the free passage of the coins through the return slot 60 to the coin return pocket 58. In other words all coins which are inserted in the machine after the registering mechanism has locked out will be returned to the operator and no machine operations will be permitted to take place.

Also, at the time said register reaches the lockout position, the locking detent lever 461 and plunger rod 469 will be locked in their locking positions by means of an obstruction lever 510. As best shown in Fig. 20, lever 510 is fixed to a stub shaft 514 and is normally urged to rock in a counterclockwise direction by the action of a spring 520. Said abutment lever 510, while in the position of Fig. 20, will permit the free movement of the detent lever 461, but when the lockout of the register is effected, the abutment lever 510 will move to a vertical position as indicated by the dot and dash lines in Fig. 20, to thereby lock the said detent lever 461 in its locking position. Movement of the abutment lever 510 is permitted when a stop lever 522, fixed on the shaft 496, is rocked away from a cooperating stop lever 526, Fig. 21, said latter stop lever being fixed to the shaft 496 and movable therewith when rocked by the action of the lockout member 488.

After a lockout is effected, the meter unit may then be removed to have the subtracting register reset. To enter the meter unit for the setting of said register, a door 543 is provided, as best shown in Fig. 7. Said door is hinged at 544 and is adapted to be opened only after a seal 545 is broken and a key actuated lock member 546 is opened.

*Return of coins after a presetting operation*

When coins are inserted in the machine, after the setting lever is pulled forward to pre-set the machine, they will be returned to the return coin pocket 58. The means provided for this purpose includes a pivotal connection for each of the coin detector units as indicated by the shafts 515, Figs. 5 and 8, and connections 516. Said connections are rocked through the engagement of a cam member 517, Fig. 3, with a roller 518, carried by an arm 519, and projecting from one of the connecting members 516, the said cam member being connected with the head of the connecting rod 93 by means of a link 537. Upon pulling the setting lever 61 forward the cam member 517 will be rocked downward about its pivot 521, which will thus rock the arm 519 and connections 516 to tip the coin detector toward the front wall of the casing, out of the path of the coin slots 63. If coins are deposited when the detectors are in said tipped position, the coins will drop from the ends of the coin slots into a suitable funnel (not shown) which will guide said coins to the coin return pocket 58.

*Limiting number of coins*

Means is provided to limit the number of coins which may be used in a complete machine cycle of operation. Said means comprises a separating pin 523 for each row of coins, which pins project forwardly from a support bracket 524, as best shown in Fig. 8, and are positioned so as to enter between the fourth and fifth coins as shown in Fig. 5, when the coin chutes 65 are moved rearward during a pre-setting operation. Suitable recesses 525 are provided in the coin guides for the pins to pass through. If more than four coins of any denomination are inserted, they will be arrested by the pins 523 when the coin chutes are moved rearward for deposit in an operating position, but on the forward movement of the coin chutes the arrested coins will drop and be moved to a visible position in view of the operator. If no further letters are to be mailed the arrested coins may be returned in the usual manner by depressing the push button 59.

*Operation*

Assuming that a person has a six cent piece of mail which he desires to mail special delivery, the total mailing charge of which would be 16¢. For such a piece of mail it would be necessary to insert a dime, a nickel and a penny or three nickels and a penny. The coins are inserted in the slots 56, Figs. 1 and 2, and after passing through coin detecting devices 64, they will enter coin chutes 65 and come to rest directly behind the visible section 57, Fig. 1. When the coins are in said latter position, the machine is operated by a manually controlled lever 61, which, when pulled forward, is adapted to prepare the machine for the stamp printing operation.

As previously stated, several devices within the machine are controlled by the movement of the manually controlled lever 61 when it is actuated by the operator. First, the coin chutes 65 are moved rearward from the visible position or the full line position of Fig. 12, into alignment with a second set of coin chutes 82 shown at the dotted line position of Fig. 12. When in the latter position, the coins will pass through said chutes 82 and will finally rest in the position shown in Fig. 6, within the coin passages 326. Here they will remain until a machine cycle of operation is started. Other devices affected by the setting of the lever 61, include a latch mechanism 125 and 135 of Fig. 10; a switch controlling mechanism 137, 143 and 145 of Fig. 10; a shutter releasing mechanism 171, 181, 185 of Fig. 16; feed belt shifting mechanism, 257, 254, 251, Fig. 16; and meter releasing mechanism 474, 464, 461 and 469, of Fig. 10. Before the coins are inserted in the machine, the mechanism is in the normal position shown in Fig. 3. Each of the above named devices will be described in the order named.

Referring to Fig. 3, it will be seen that the latch mechanism 135, 125 is disengaged. Upon pulling the lever 61 from the dot and dash line of Fig. 10 to the full line position, the shaft 95 and the member 135 will be rocked in a clockwise direction, by means of the link and lever connections 99, 98, 104 respectively. Also, by means of the same movement of the lever 61, the latch lever 125 will be urged in a counter-clockwise direction, by the link and lever connections 133, 132 and 116. This combined movement will cause the latch lever 125 to become engaged with the member 135, as shown in full lines of Fig. 10, which members will remain in said position under the tension of a spring 146.

Further, when the shaft 95 is rocked, the link and lever connections 130, 136 and 137 are moved and the pawl 143 is engaged beneath the lug 145 of the latch lever 144. Said latch is directly associated with a switch device shown in Fig. 22, which switch is adapted to be later moved to a circuit closing position when a lever 164 is rocked in a clockwise direction about the axis of the shaft 139. The rocking of said shaft 139 is effected by the movement of the latch mechanism 143, 145 when a tripping operation occurs, in a manner which will be later described.

The letter shutter 171, which is shown in its locked or closed position in Fig. 16, is adapted to be released when the lever 61 is moved to the full line position of Fig. 10. Shaft 186 is rocked, as best shown in Fig. 11, by means of the link and lever connection 193, 191 respectively, when the lever 148 is rocked and engages member 195. This movement will cause the link 193 to be moved, which in turn will rotate the shaft 186 in a clockwise direction and cause a pin 184, Fig. 16, on a lever 185 to engage a lever 181 and rock an abutment end 179 thereof out of the path of a tail 178 on the lower end of the shutter member 171. Further movement of the lever 185 will cause a pin 188 to engage said tail 178 and rock the shutter member in a counter-clockwise direction against the tension of a spring 175. The shutter 171 will then take the position as shown in Fig. 27 to thereby provide a clear passage to the printing mechanism for the purpose of permitting the insertion of letters as shown in said Fig. 27.

To permit movement of the letters to the position shown in Fig. 27, the feed belts 236—236 are moved from the dot and dash line position of Fig. 27 to the full line position. The means provided for said movement of the feed belt is best shown in Fig. 10. Referring to the operation of said latter means, the movement of the manual lever 61 from the dotted position of Fig. 10 to the full line position will cause a lever 108 to be rocked in a counter-clockwise direction, and, by means of a plunger rod 112 at the upper end thereof, engagement will be made with the end 258 of lever 257 to effect the rocking action of the shaft 256 and consequently effect the camming action of the roller 254 against the arm 253 of lever 251. Said lever 251 is thus rocked in a clockwise direction and will effect a slight downward movement of the free end of the feed belts 236.

The meter mechanism, which is normally locked as best shown in Fig. 20, by means of the engagement of locking pin 471 with the slot 472, and the further engagement of the detent 462 between the teeth of the intermediate gear 457, is also released to provide for the setting of the registering mechanism during a machine cycle of operation. The releasing means is controlled, as best shown in Fig. 10, by means of the manual lever 61 which rocks the shaft 95 in a manner as previously described, and through a lever 476, secured to said shaft 95, will cause a pin 474 to be forced upward to a meter opening 468 into engagement with the lower end of a rod 464. The rod 464 is thus moved upward to rock the lever 461, which action will cause the detents 462 and 471 to be withdrawn from their locking positions.

Having pre-set the above named mechanism the machine is ready to be tripped for a printing cycle of operation. Said tripping operation is effected as best shown in Fig. 27, when a letter is passed through the shutter opening and engages fingers 225 of a universally mounted trigger unit to cause the lower end or control bar 227 to engage with the blade 128 of the latch lever 125 and effect the disengagement of said latch lever from the member 135. Said latch release will cause the latch mechanism and parts affected thereby to be returned to their normal position shown in Fig. 3, the controlling force for the return of the parts being the spring 146.

The latch parts 149 and 143 of Fig. 10 will also be returned to the position shown in Fig. 3 when the tripping of the machine is effected, the shaft 139 of Fig. 22 being rocked to cause the lever 164 to throw the mercury switch 151 to a circuit closing position. As a result of the latter movement, the motor 168 of Fig. 6 is energized and the shaft 266 of Fig. 23 is driven. The first clutch member, designated by the reference numeral 269 in Fig. 23, will then start its cycle of movement and through the gear drive 275 and 276 of Fig. 9, will cause the rotation of the shaft 277 through six revolutions, which in turn will effect the oscillation of the coin engaging members 83 of Fig. 6. Said coin engaging members will thus be oscillated six times and will strip the lowermost coins of each denomination during each oscillation thereof, as best shown in Fig. 24.

Upon being stripped, each coin will engage its respective roller 349, Fig. 24, to effect the motion of levers 345 and control the movement of their respective pinions 351a, 352a, and 353a, with respect to their driving mutilated gears 351, 352, and 353 of Fig. 6. Through the splined shaft 354 of Fig. 6 and the connection of the keyed end 365 thereof with the slotted end 353, Fig. 18, of the coupling 321 in the meter unit, the accumulated movement resulting from the drive of the mutilated gears is transferred to the pinion 318 on the splined shaft 319. Gear 318 will drive gear 317, which will eventually effect the setting of the units type wheel 308 of Fig. 15 through the medium of the gear 313 and pinion 312. Simultaneous with the setting of the type wheels, the gear 318 will rotate the register setting gear 457, Fig. 20 to thereby set-up the coin value in the registering mechanism.

After the first clutch 269 has completed one revolution or its cycle of movement, the type wheel setting operation is completed, and the second clutch member 270 is operated to start the printing cycle of motion. The drive of the printing drum is provided from the second clutch member by means of the sleeve 260a and a key 382, Fig. 23, which fits into a slotted sleeve 383, 384 of the meter unit, as shown in Fig. 19, then through the shaft 385 and gear 387, which latter gear is adapted to mesh with a gear 388 on the drum as shown in Figs. 17 and 18.

The letter, upon being inserted in the machine as in Fig. 27, will be interrupted in its movement toward the printing drum momentarily, when the fingers 225 of the trip unit engage an abutment 233. This is done for the purpose of allowing time for the setting of the type wheels. Before the printing drum does start to rotate, the trip unit is withdrawn from the path of the letter, or from the full line position of Fig. 27 to the dotted line position, during the initial movement of the shaft 389. The Geneva drive 389, 391, shown in Fig. 17, provides for the necessary dwell of the printing drum during the latter period.

When rotation of the printing drum starts, the movement of the feed belt 236 is also started, and since said feed belts are now in engagement with the letter, the said letter is drawn into the machine where it will become impinged between the printing drum and the impression roller in time to have the stamped impression imprinted thereon. During the printing operation the letter will move between the printing drum 302 and impression roller 242, then will be finally ejected into the letter receptacle 53.

Having described the invention, what is claimed is:

1. In a coin operated value stamp printing machine, a value stamp printing device including an adjustable value type member, a coin receiving member including means to support a plurality of coins in a row therein, movable means engageable with each of the coins successively to remove same from the receiving member, and means for setting the type members, said last named means being connected with the type members and being positioned for engagement by each coin when moved by the movable means from the receiving member.

2. In a coin operated machine for the printing of stamp impressions upon letters inserted therein, a printing member having settable value type therein, coin receiving means, devices including connections to said type and engageable by the coins, coin ejecting means associated with said devices, whereby the said devices and type members are set during a coin ejecting operation, a normally inactive drive connected with the printing device and coin ejecting means, and letter operated trip means connected with the drive to initiate operation of said drive after inserting a letter in the machine.

3. In a coin operated machine adapted for the printing of value stamp impressions on letters placed therein, a printing device having adjustable value type members, coin receiving means arranged to receive a plurality of coins of different values and to initially support same in a non-operating position, a normally inactive coin engaging member, a second coin receiving means, manipulative means adapted to move and deposit the coins in a vertically disposed relation within the second coin receiving means, whereby the lowermost coin will be in an operative position with relation to said coin engaging member, a drive to actuate said coin engaging member, a tripping device coupled with said drive and operable upon inserting a letter in the machine, to thereby effect the operation of said drive, and devices controlled by the individual coins to set the type members in accordance with the value of said coins.

4. In a coin operated mailing machine, a value stamp printing member having adjustable value type members, coin devices for the reception of coins of a plurality of denominations, drive means co-operating with said coin devices to set the denomination of the type members in accordance with the value of the total number of coins received by said coin devices at any one time, tripping means associated with said drive means and operable upon the insertion of a letter in the machine to effect the operation of said drive, and a second drive controlled by the first named drive to drive the printing member through a cycle of printing operation after the type setting operation is completed.

5. In a coin operated machine adapted for the printing of a value stamp impression upon letters, a value stamp printing device having adjustable value printing members, coin receiving means for the reception of coins of a plurality of denominations including means to initially support said coins in a visible position to permit a check of the coins before the machine cycle of operation is started, coin engaging members arranged to act upon each of the coins, means controlled by each coin after engagement by the coin engaging members to actuate the type members and thereby set up the value of said coins in the type members during a machine cycle of operation, manipulative means to move the coins from the visible position to an operating position with respect to the coin engaging members, and means to start the machine cycle of operation upon inserting a letter in the machine.

6. In a coin operated mailing machine, a value stamp printing device having adjustable value type members associated therewith, a coin receiver adapted to receive and support a plurality of coins in an initial non-operating position, a visible receptacle wherein the coins are visible to the operator for checking while in said non-operating position, manipulative means including connections arranged to move the coin receiver away from the visible position and direct said coins to an operating position after the checking thereof, and means controlled by the coin to set the value type members in accordance with the total value of the coins during a machine cycle of operation.

7. In a coin operated mailing machine, a value stamp printing device having printing type wheels, coin receiving means for the reception of coins of a plurality of denominations and adapted to maintain same temporarily in a non-operating position, manually controlled means including connections arranged to move the coin receiving means and coins from said non-operating position to an operating position, means to effect movement of each coin through a predetermined path when in said operating position, actuating members engaged by the coins and arranged to set the type wheels during the latter movement thereof in accordance with the value of the total number of coins placed in the machine, and means for operating the coin moving means.

8. In a coin operated machine adapted for the printing of a value stamp impression upon letters, a value stamp printing device including adjustable value type members, a resettable registering device including register wheels adapted to register the value of each stamp printed, coin devices including a coin receiver, a coin return pocket and a coin stop interposed between the coin receiver and return pocket, coin actuated members including connections arranged to set the type members and register wheels in accordance with the value of the coins, a drive for said printing device, said coin actuated members and printing device being operable upon inserting a letter in the machine, and means to remove the coin stop from the path of the coins after a predetermined value has been reached in the registering device, to thereby return the coins which are thereafter inserted in the machine to the coin return pocket, and to prevent further operation of the machine until the registering device has been reset.

9. In a coin operated machine adapted for the printing of a value stamp on letters inserted therein, coin controlled value set-up devices, a printing member, a shutter normally blocking the letter path to the printing member, means to normally lock said shutter member in a fixed position, manipulative means to free said shutter, and means to prevent movement of the manipulative means and consequently said shutter until a coin is inserted in the machine.

10. In a coin operated mailing machine, a value stamp printing device having adjustable value type members, coin receiving means for the reception of coins of a plurality of denominations, driven variable toothed gear members each having a number of teeth agreeing with the value of one coin denomination, pinion gears movable from a normally non-operative position to an operative position with relation to each of the said variable gear members, connections between said pinion gears and type members, pinion gear shifting means, and means whereby said shifting means is controlled by said coins.

11. In a coin operated machine, a value stamp printing device having adjustable value type members, coin receiving means adapted to receive and temporarily support a plurality of coins of different denominations in a non-operating position, manipulative means adapted to move the coin receiving means and direct the coins to an operative position, means for ejecting each coin when in said operative position, means controlled by the total number of coins during the process of ejection including connections arranged to set said type members to the total value of the coins, means to discontinue the operation of said coin ejecting means after a predetermined number of operations, and means to drive said printing device through a printing cycle of operation after the discontinuance of the coin ejecting means.

12. The combination with a coin operated mechanism; of coin receiving means arranged to support a plurality of coins of different denominations in rows in edge to edge vertical relation, an oscillating mechanism arranged to strip the lowermost of each of said coins during each oscillation thereof, means to rock said oscillating mechanism a predetermined number of times, control members lying in the path of the coins and adapted to be moved by said coins, and devices connected with said control members adapted to be actuated in a manner agreeing with the differing values of the coins.

13. In a coin operated mailing machine adapted for the printing of value stamp impressions on letters placed therein, a printing device having adjustable value type members, coin receiving means including a plurality of coin chutes, each chute being adapted to receive a plurality of coins, the total number of coins in all chutes agreeing with the value of the stamp impression to be made, a drive, and cyclic control means associated with said drive to provide for the setting of the value of the total number of coins in the type wheels, then for a printing cycle of operation.

14. In a coin operated machine, coin controlled devices, a receptacle having coin compartments each adapted to initially receive a plurality of coins, manipulative means to move said coin receptacle and to direct the coins to an operating position with respect to the coin controlled devices, and means to prevent more than a predetermined number of coins to pass from each compartment to said coin controlled devices.

15. In a coin operated machine adapted for the printing of a value impression upon letters, a value stamp printing device having adjustable value type members, coin devices adapted to receive and support the total number of coins of a plurality of denominations agreeing with the value of the stamp to be printed, operating members arranged to act upon each coin during a machine cycle of operation, devices connected to said adjustable type members and controlled by the coins when acted upon by the operating members, whereby the total value of the stamp to be printed will be set up in the adjustable type members, a power drive, and a letter controlled tripping member associated with said drive and means connecting said power drive with the operating members, and operable upon the insertion of a letter in the machine to thereby drive said operating members and to effect a printing operation.

16. In a coin operated machine adapted to print value stamp impressions upon letters inserted in said machine, coin receiving means including a plurality of coin chutes each adapted to support a plurality of coins, settable value printing means adapted to print stamps to the value of the total number of coins received, a drive, manipulative means, devices associated with the drive adapted to be pre-set by said manipulative means, coin controlled devices including coin stripper means and connections to the value printing means adapted to be controlled by said drive, and trip mechanism arranged to effect the operation of said drive and consequently said printing means after said pre-setting operation and upon inserting a letter in the machine.

17. In a coin freed mailing machine; a base unit including coin controlled devices and a drive; a removable meter unit including adjustable value printing members and settable registering means, and means for detachably connecting the coin controlled devices and drive with the value printing members and registering means, whereby said meter unit may be removed for the manual setting of said registering means to restrict the operation of the machine to within the limit of a predetermined value, and may be replaced in the machine in such position that both the value printing devices and registering means may be adjusted to the value of the coins inserted in the machine by means of said coin controlled devices and drive during a machine cycle of operation.

18. In a coin operated machine adapted for the printing of value stamp impressions upon letters placed therein; a printing member having adjustable value type, coin controlled devices associated with said value type and arranged to adjust the type in said printing member, coin positioning means adjacent said coin controlled devices, a power drive to actuate said coin positioning means and printing member sequentially, electrical control means including a normally open switch member connected with the drive, a latching device normally arranged in an unlatched position, means associated with the latching device and switch member for actuating the switch member, a manually controlled setting member arranged to set the latching device in a latched position, said connecting means being movable relative to said switch member and adapted to be moved to a potential actuating position when said latch is set by said manual member, and a trigger unit associated with said latching device and disposed in the path of a letter, whereby, when a letter is inserted in the machine and engages the trigger unit, the latch is released and said connecting means will move in a direction to actuate the switch member.

19. In a coin operated machine for the printing of a value stamp impression upon letters, coin devices, a printing member having adjustable value type members, resettable registering means, means connecting the coin devices with said value type members and registering means, drive means connected with the coin devices and printing member, means to effect the operation of said drive after a coin is inserted in the machine, and lockout means controlled by the registering means to prevent the operation of the drive after a predetermined value has been registered in said registering means.

20. In a coin operated machine for the printing of a value stamp impression upon letters, coin receiving means, a printing member having adjustable value type members, resettable registering means, coin controlled devices connected with said value type members and registering means, means to move the coins in said coin receiving means into engagement with said coin controlled devices, drive means connected with the coin moving means and printing member, means to effect the operation of said drive after a coin is inserted in the machine, and lockout means controlled by the registering means to prevent the operation of the drive after a predetermined value has been registered in said registering means.

21. In a coin operated mailing machine, a value stamp printing device having adjustable value type members, coin receiving means for the reception of coins of a plurality of denominations, a set of driven variable toothed gear members each having a number of teeth agreeing with the value of one coin denomination, a set of pinion gears, one of each set of gears being movable from a normally non-operative position to an operative position with relation to the other set of gear members, connections between said pinion gears and type members, shifting means, and means whereby said shifting means is controlled by said coins.

22. In a combined coin and letter controlled prepaying machine for printing a value stamp upon letters, a printing member, a normally inactive power drive connected with the printing member, coin receiving means to initially support a coin, manipulative means, a settable tripping device associated with said manipulative means and settable thereby preparatory to starting a machine cycle of operation, means to guide a letter to a printing position, and letter controlled means cooperating with the tripping device and controlling the drive, said letter controlled means having a part thereof positioned in the path of a letter when inserted in the machine to permit the operation of said drive and thereby effect a printing operation.

23. In a prepaying machine for printing a value stamp upon letters, a printing member having settable value type therein, a normally inactive drive connected with the printing member, a coin supporting device, means controlled by the drive to effect movement of said coin supporting device and coin, coin controlled means operable by the coin during the latter movement thereof to control the setting of the value type, means to guide a letter to a printing position, and a letter controlled tripping device controlling the drive and having a part thereof positioned in the path of the letter when inserted in the machine to permit the operation of said drive and thereby effect a value setting and a printing operation.

LINDEN A. THATCHER.